United States Patent [19]

Higaki et al.

[11] Patent Number: 5,481,679
[45] Date of Patent: Jan. 2, 1996

[54] DATA PROCESSING APPARATUS HAVING BUS SWITCHES FOR SELECTIVELY CONNECTING BUSES TO IMPROVE DATA THROUGHPUT

[75] Inventors: Nobuo Higaki, Osaka; Toshimichi Matsuzaki, Minou, both of Japan

[73] Assignee: Matsushita Electric Industrial Co., Ltd., Osaka, Japan

[21] Appl. No.: 121,799

[22] Filed: Sep. 15, 1993

[30] Foreign Application Priority Data

Sep. 16, 1992 [JP] Japan .................................. 4-246659

[51] Int. Cl.⁶ .............................. G06F 13/00; G06F 13/42
[52] U.S. Cl. ........................ 395/308; 395/775; 364/240; 364/240.2; 364/240.5; 364/259; 364/259.9; 364/DIG. 1
[58] Field of Search ................................ 395/325, 375, 395/775, 800, 425

[56] References Cited

U.S. PATENT DOCUMENTS

| | | | |
|---|---|---|---|
| 4,434,466 | 2/1984 | Friedli et al. | 395/725 |
| 4,445,193 | 4/1984 | Mueller et al. | 395/200 |
| 4,639,910 | 1/1987 | Toegel et al. | 370/58.1 |
| 4,787,082 | 11/1988 | Delaney et al. | 370/85.1 |
| 5,016,169 | 5/1991 | Koya et al. | 395/375 |
| 5,056,000 | 10/1991 | Chang | 395/325 |
| 5,165,026 | 11/1992 | Kusakabe | 395/375 |
| 5,179,734 | 1/1993 | Candy et al. | 395/800 |
| 5,212,631 | 5/1993 | Schmidt et al. | 364/136 |
| 5,247,639 | 9/1993 | Yamahata | 395/425 |
| 5,247,689 | 9/1993 | Ewert | 395/800 |

FOREIGN PATENT DOCUMENTS

| | | | |
|---|---|---|---|
| 0073419 | 8/1982 | European Pat. Off. | G06F 9/24 |
| 0346917 | 6/1989 | European Pat. Off. | G06F 13/28 |
| 2021823 | 4/1979 | United Kingdom | G06F 13/00 |

OTHER PUBLICATIONS

International Conference on Acoustics, Speech and Signal Processing. vol. 4, 23 May 1989, Glascow, Scotland, pp. 2480–2483, Kloker et al., 'the motorola DSP96002 IEEE floating-point digital signal processor'.

Twenty-Second Asilomar Confeence on Signals, Systems, & Computers, vol. 1, Oct. 31, 1988, California, USA, pp. 885–889, D. A. Ash 'enhanced performance single-chip DSP requires minimal external circuitry'.

Primary Examiner—Gopal C. Ray
Attorney, Agent, or Firm—Price, Gess & Ubell

[57] ABSTRACT

A data processing apparatus is described, including a first bus connecting an instruction storage unit and an instruction preparation unit, a second bus connecting an instruction execution unit and a data storage unit, a bus switch selectively connecting and disconnecting the first and second buses electrically, and a control unit controlling the operation of the bus switch responding to the operations of the instruction preparation unit and the instruction execution unit. When the first and second buses are connected by the bus switch, access from the instruction preparation unit to the data storage unit and access from the instruction execution unit to the instruction storage unit can be performed. On the other hand when the buses are not connected, instruction fetch from the instruction preparation unit and data access from the instruction execution unit can be concurrently performed. Hence, data throughput on the buses can be improved and the load capacity can be reduced, which leads to heightening of the clock frequency.

34 Claims, 27 Drawing Sheets

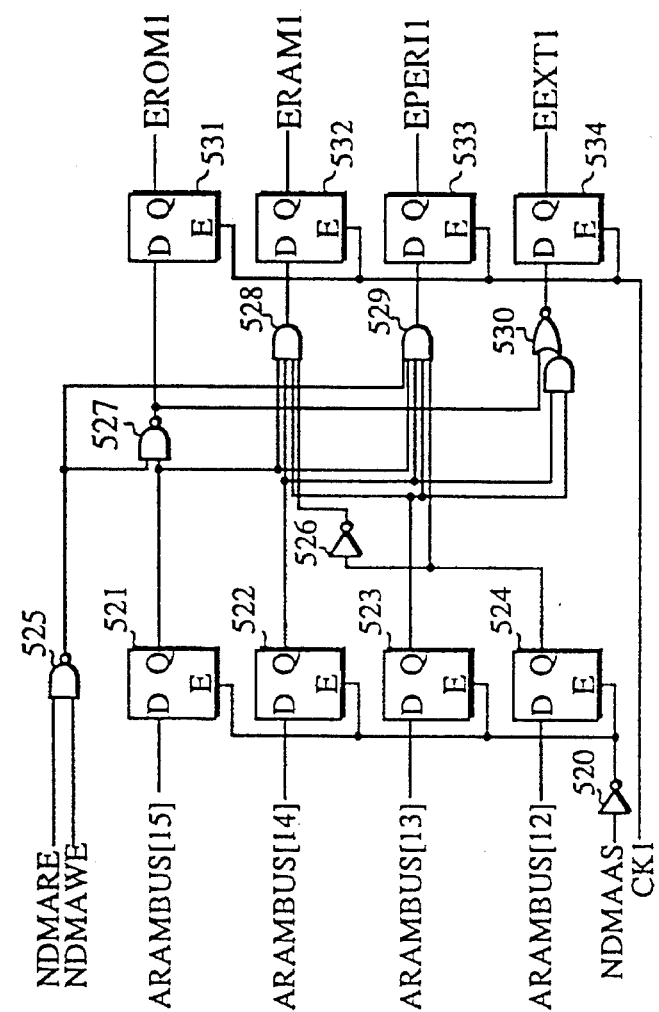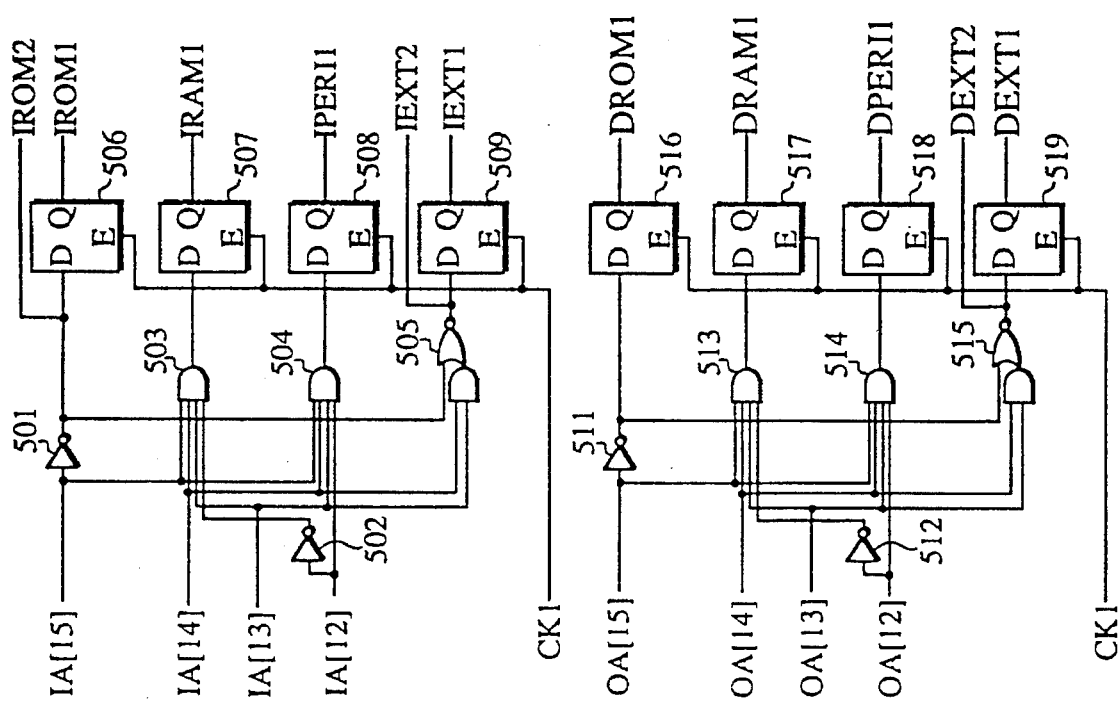
Fig.5

Fig. 13 first bus switch 117 (data bus)

Fig. 14 first bus switch 117 (data bus)

Fig.15 second bus switch 118 (address bus)

Fig.16 second bus switch 118 (data bus)

Fig.17  external I/F unit 116 (address bus)

Fig.19

| BUSST[3.0] | BUS STATES |
|---|---|
| 0000 | idle (no access) |
| 0001 | reserved |
| 0010 | transfer of word operand or second byte operand (operand transfer other than 0011) |
| 0011 | transfer of first byte operand (first byte transfer in the case that 16-bit data is loaded/stored outside with 8-bit external data bus) |
| 0100 | transfer of word instruction or second byte instruction (instruction transfer other than 0101) |
| 0101 | transfer of first byte instruction (first byte transfer in the case that 16-bit instruction is fetched from outside with 8-bit external data bus) |
| 0110 | concurrent transfer of instruction and operand or concurrent transfer of second byte instruction and operand (concurrent transfer other than 0111) |
| 0111 | concurrent transfer of first byte instruction and operand (first byte transfer in the case that 16-bit data is loaded/stored outside with 8-bit external data bus) |
| 1000 | released (access by an external circuit) |
| 1001 | reserved |
| — | — |
| 1111 | reserved |

DATA PROCESSING APPARATUS HAVING BUS SWITCHES FOR SELECTIVELY CONNECTING BUSES TO IMPROVE DATA THROUGHPUT

BACKGROUND OF THE INVENTION (1) Field of the Invention

This invention relates to a data processing apparatus comprising a CPU, a memory to store instructions, a memory to store data, and peripherals including, for example, a direct memory access controller (DMAC).

(2) Description of the Related Art

With improvement of micro electronics technology, data processing apparatuses in which CPU, memories and their peripherals are packaged into one chip have been prevalent. Generally, such a data processing apparatus is constructed so that all of its processor core, internal ROM/RAM for respectively storing instructions and data, and internal peripherals are mounted on a single chip.

FIG. 1 shows the construction of the data processing apparatus as a first example of the related art. The data processing apparatus is composed of an instruction decoder 1001 for decoding instruction codes to control operations of each unit, a program counter (PC) unit 1002 for calculating instruction addresses to be executed next, a data path unit 1003 for performing arithmetic by, for example, an arithmetic and logic unit, an internal ROM 1004 for storing instructions, an internal RAM 1005 for storing data, internal peripherals 1006 including DMAC and a timer, and a bus interface unit 1007 for controlling data transfer between the units 1001–1003 which are referred to as the processor core and the units 1004–1006 which are referred to as the on-chip resources.

The bus interface unit 1007 has an instruction fetch buffer 1011, an instruction address buffer 1012, an operand address buffer 1013, a load buffer 1014, and a store buffer 1015 for temporarily storing instruction codes, instruction addresses, operand addresses, data loaded by the data path unit 1003, and data stored by the unit 1003 respectively. The bus interface unit 1007 further has an external bus interface (I/F) unit 1016 for controlling data transfer to or from external address/data buses, and a bus control unit 1017 for controlling these buffers and outputting control signals to each of the internal ROM 1004, internal RAM 1005, internal peripherals 1006, and the external address/data buses.

The data processing apparatus constructed as above is operated as follows:

To transfer instructions or data, the processor core and the on-chip resources are interconnected by a single address bus and a single data bus. This may cause contention for bus access, so that to avoid bus conflicts, the bus control unit 1017 arbitrates bus access by, for example, giving precedence to one over the other.

FIG. 2 shows the construction of the data processing apparatus as a second example of the related art. The construction is the same as that of the first example shown in FIG. 1 except for the following aspects.

To avoid bus conflicts which can be caused between fetching instructions and loading/storing data, instruction data/address buffers 1111/1112 are directly connected to the internal ROM 1004 through a pair of exclusive address/data buses, while an operand address buffer 1113, a load buffer 1114, and a store buffer 1115 together share a pair of common internal address/data buses to communicate with the internal RAM 1105, peripherals 1106 and an external bus I/F unit 1116.

This construction of the second example makes it possible to fetch an instruction and to access data at the same time. For example, an instruction can be fetched from the internal ROM 1104 to the instruction decoder 1101 while data is being accessed from the data path unit 1103 to the internal RAM 1105.

However, these data processing apparatuses have respective problems as follows:

According to the first example, too small data throughput in the buses, as compared with the data processing capacity of the processor core, prevents enhancing the performance of the data processing apparatus. For example, while the data bus is occupied for fetching an instruction code from the internal ROM 1004 to the instruction decoder 1001, the internal RAM 1005 or the peripherals 1006 cannot be accessed. In the same manner, while the data bus is occupied for loading/storing data from/to the internal RAM 1005, the internal ROM 1004 cannot fetch an instruction code.

Furthermore, the load capacity of the address/data buses is increased by a large number of hardware resources connected therewith. This causes waveform distortion, preventing clock frequency improvement.

According to the second example, on the other hand, the data path unit 1103, which cannot directly read operand data (constant data used for executing an instruction, for instance) from the internal ROM 1104, must receive such operand data from the instruction decoder 1101 by way of a ROM data transfer bus. This causes considerable deterioration to the performance of the data processing apparatus.

SUMMARY OF THE INVENTION

A first object of this invention is to provide an improved data processing apparatus with high data throughput and clock frequency.

A second object of this invention is to provide an improved data processing apparatus further having the advantage of easily replacing internal peripheral circuits with another circuit having a different function from the internal peripheral circuits.

The first object can be achieved by a following data processing apparatus provided with an instruction storage unit, an instruction preparation unit, an instruction execution unit, and a data storage unit. The data processing apparatus comprises: a first bus for connecting the instruction storage unit and the instruction preparation unit; a second bus for connecting the instruction execution unit and the data storage unit; a first switch for selectively connecting and disconnecting the first and second buses electrically; and a control device for controlling the operation of the first switch, responding to operations of the instruction preparation unit and the instruction execution unit.

The first bus may include an m-bit first address bus and an n-bit first data bus (m and n are integers). The second bus may include an m-bit second address bus and an n-bit second data bus. The first switch may include an m-bit first bus transceiver for bidirectionally connecting and disconnecting the first and second address buses, and an n-bit second bus transceiver for bidirectionally connecting and disconnecting the first and second data buses.

The above-mentioned control device may comprise a detecting device for detecting: a first request indicating a request to access from the instruction execution unit to the instruction storage unit, a second request indicating a request to access from the instruction preparation unit to the data storage unit, a third request indicating a request to access from the instruction preparation unit to -the instruction storage unit, and a fourth request indicating a request to access from the instruction execution unit to the data storage unit, and may further comprise a bus control device for controlling to connect the first switch when one of the first and second requests are detected and to disconnect the first switch when the third and/or fourth request are detected.

The detecting device may comprise: a first decoding circuit for decoding an address inputted from the instruction preparation unit through the first address bus, the decoded address being regarded as the third request when the decoded address is for the instruction storage unit, and being regarded as the second request when the decoded address is for the data storage unit; and a second decoding circuit for decoding an address inputted from the instruction execution unit through the second address bus, the decoded address being regarded as the first request when the decoded address is for the instruction storage unit, and being regarded as the fourth request when the decoded address is for the data storage unit.

The n-bit second bus transceiver may be so constructed that lines composing each data bus corresponding to r-bit ($1 \leq r \leq n-1$) can be connected and disconnected independently of the other lines corresponding to (n–r) bite.

The control device may comprise: a direction detecting device for, as a predetermined direction, detecting an input of a signal indicating that the (n–r) bit of the n-bit instruction to be read out next corresponds to data, and a first switch control device for controlling the second bus transceiver to disconnect the r bit lines and to connect the (n–r) bit lines, responding to detection of the predetermined direction.

The n may be 16 and the r may be 8.

The data processing apparatus may further comprise: a third bus for connecting one or more peripheral circuits therewith; and a second switch for selectively connecting and disconnecting the second and third buses electrically. The control device controls the operation of the second switch, responding to operations of the instruction preparation unit and the instruction execution unit.

The data processing apparatus may further comprise: a third switch for selectively connecting and disconnecting the second bus and an external bus therewith electrically. The external bus includes an external address bus and an external data bus and connects external circuits and/or an I/O device. The control device controls the operation of the third switch, responding to operations of the instruction preparation unit and the instruction execution unit.

According to the data processing apparatus constructed as mentioned above, the control device controls connecting/disconnecting operations of the first switch.

When the first switch is not connected, the instruction preparation unit can only access the instruction storage unit and the instruction execution unit can only access the data storage unit. In addition both can be accessed concurrently. On the other hand, when it is connected, the instruction preparation unit can access the data storage unit and the instruction execution unit can access the instruction storage unit. Thus, concurrent access can improve data throughput of the buses, while bus separation can reduce bus load capacity, thereby decreasing waveform distortion. This leads to heightening the clock frequency, thus enhancing the performance of the data processing apparatus.

The second object can be achieved by a data processing apparatus, wherein, when an external signal directing to release internal hardware resources is inputted, the control device controls the first, second and third switch so that the external circuits and/or the I/O device can access the instruction storage unit, the data storage unit and the peripheral circuits through the external bus and the third switch.

The control device may further comprise an inhibition request detecting device for detecting an inhibition request for inhibiting the use of the peripheral circuits, the request being made by the external circuits and/or the I/O device.

The bus control device inhibits accessing to the peripheral circuits when the inhibition request is detected.

According to the data processing apparatus having the additional function as mentioned above, adaptation of the external DMAC is improved and testing of the internal resources is simplified by adding a small amount of hardware. In addition, internal peripherals can be replaced by external peripherals.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 is an example of the address space discrimination circuit of the bus control unit appeared in FIG. 4.

FIG. 19 is a list showing a bit assignment of the bus state signal according to the embodiment.

DESCRIPTION OF THE PREFERRED EMBODIMENTS

Embodiment 1

A data processing apparatus according to this embodiment is described as follows with reference to FIGS. 3–24.

In parentheses after each signal is the abbreviation form of the signal appeared in these drawings, and the initial "N" of the form stands for "negative", telling that the signal is active low. In brackets after each signal is a bit position of the signal; for example, [15:0] indicates bits 15-0.

Figure 1:
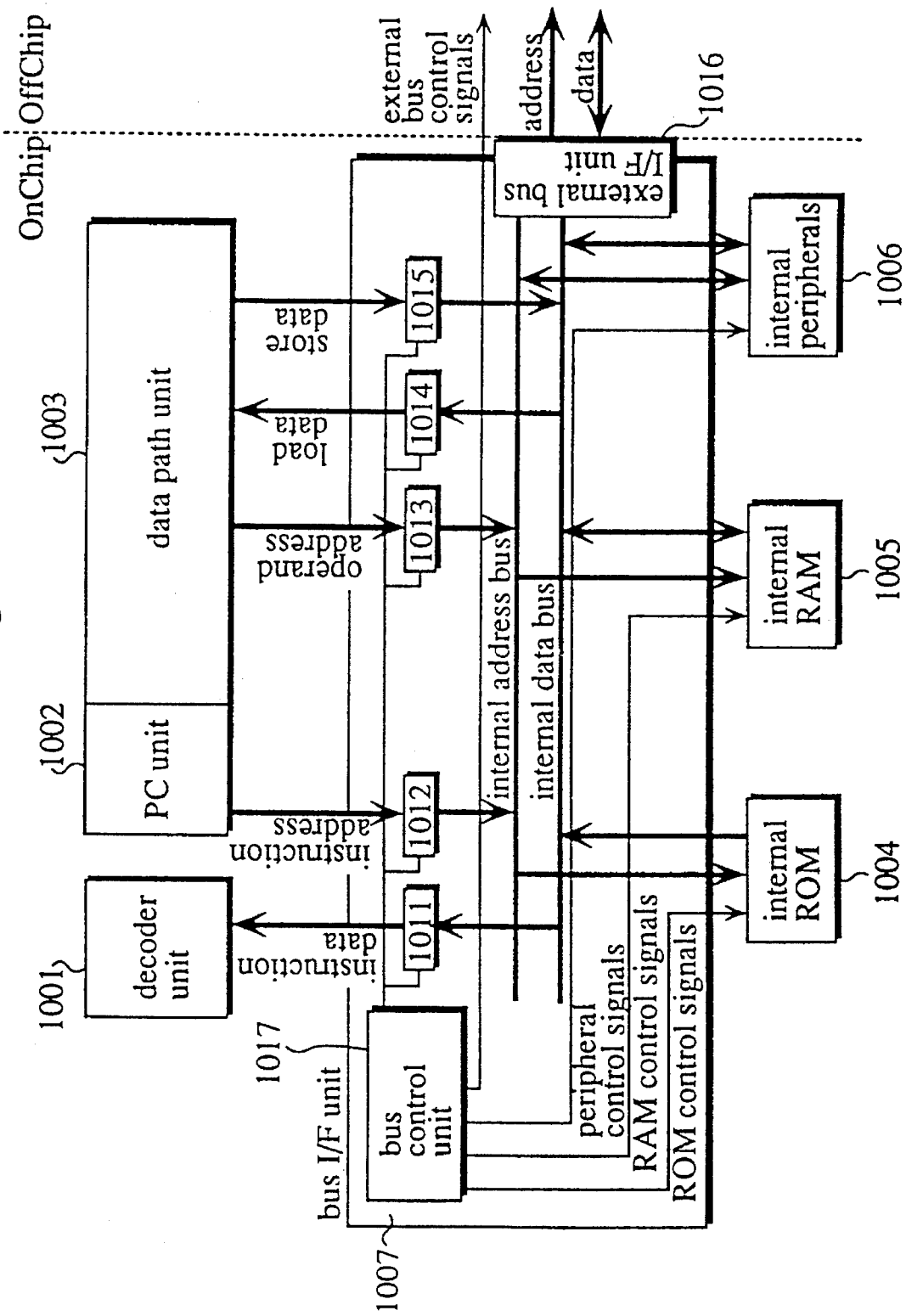
FIG. 1 shows the construction of the data processing apparatus as a first example of the related art.
Figure 2:
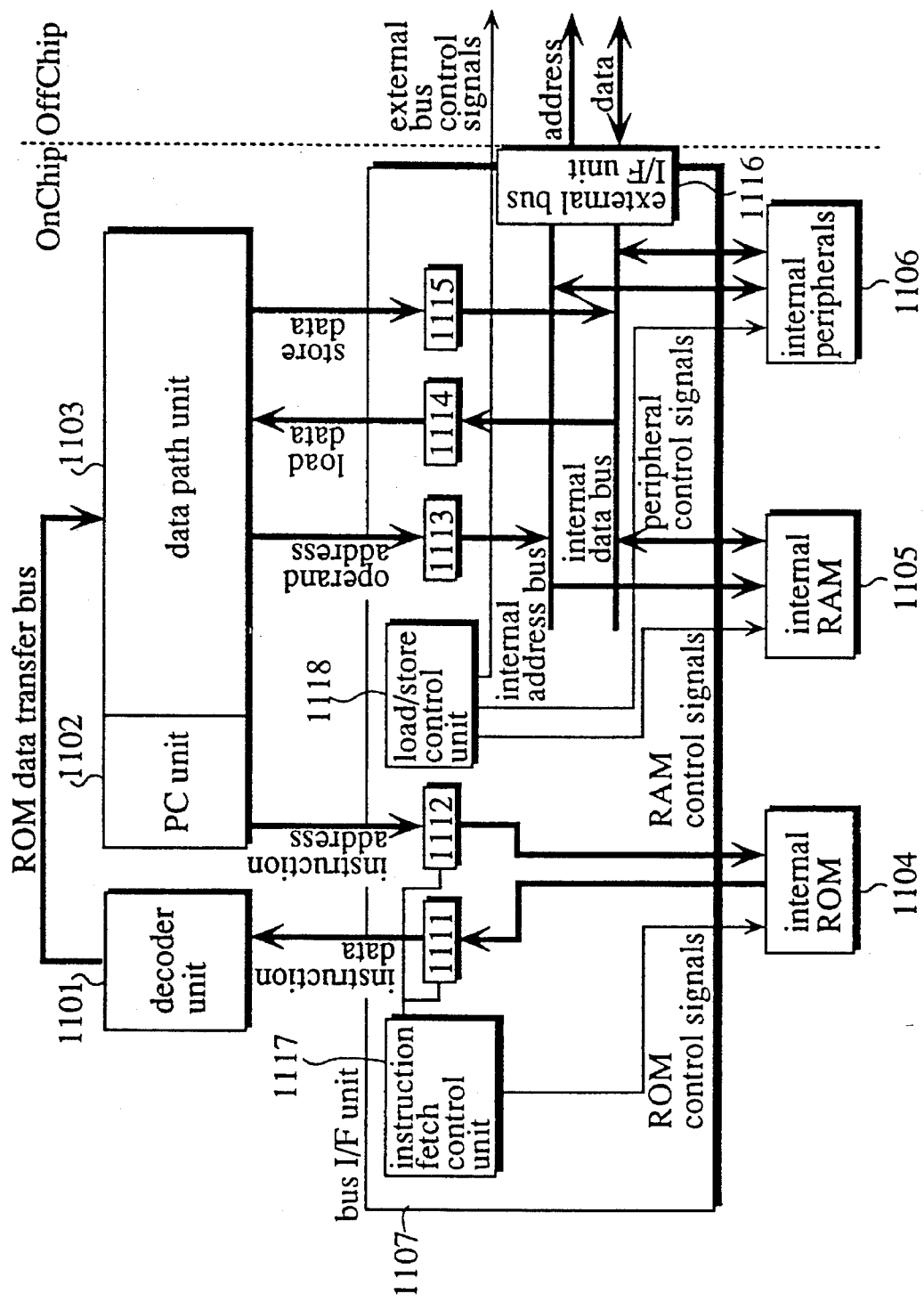
FIG. 2 shows the construction of the data processing apparatus as a second example of the related art.
Figure 3:
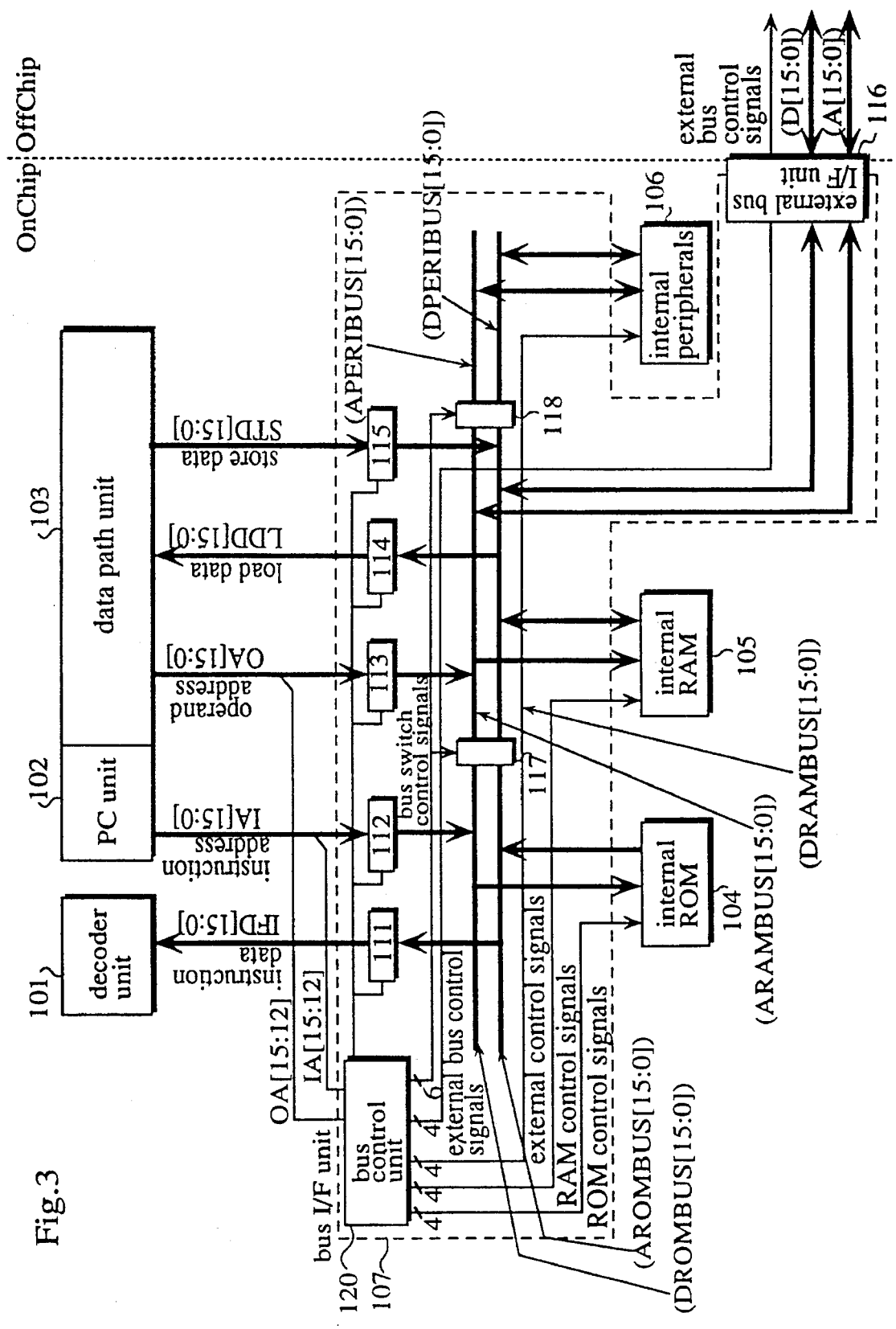
FIG. 3 is a block diagram showing the construction of the data processing apparatus of a first embodiment of this invention.

In FIG. 3 showing the construction of the data processing apparatus according to this embodiment, an instruction decoder 101 decodes instructions and outputs control signals to a PC unit 102 and a data path unit 103, these three units being referred to as the processor core.

The PC unit 102 calculates instruction addresses to be decoded in the instruction decoder 101, accessing them to an internal ROM 104.

The data path unit 103 performs arithmetic or process in response to control signals outputted by the instruction decoder 101, accessing the internal ROM 104 and an internal RAM 105.

The internal ROM 104 stores programs composed of instruction codes and is accessed by the PC unit 102 or the data path unit 103. A data bus and an address bus which are connected to the internal ROM 104 are referred to as the DROMBUS and the AROMBUS respectively.

The internal RAM 105 stores data and is mainly accessed by the data path unit 103. A data bus and an address bus which are connected to the internal RAM 105 are referred to as the DRAMBUS and the ARAMBUS respectively.

Internal peripherals 106 may include DMAC or a timer. A data bus and an address bus which are connected to the internal peripherals 106 are referred to as the DPERIBUS and the APERIBUS respectively.

A bus interface unit 107 provides the interface between the processor core and the on-chip resources by means of the address/data buses.

This bus interface unit 107 consists of following units 111–120:

The instruction fetch buffer 111 temporarily stores fetched instructions (IFD).

The instruction address buffer 112 temporarily stores instruction addresses (IA) to be fetched.

The operand address buffer 113 temporarily stores operand addresses (OA) to be loaded or stored.

The load buffer 114 temporarily stores data (LDD) to be loaded to the data path unit 103.

The store buffer 115 temporarily stores data (STD) outputted from the data pass unit 103.

The external bus I/F unit 116 interfaces the internal address/data buses with external address/data buses.

The first bus switch 117 connects or disconnects the AROMBUS and the ARAMBUS as well as the DROMBUS and the DRAMBUS.

Figure 13:
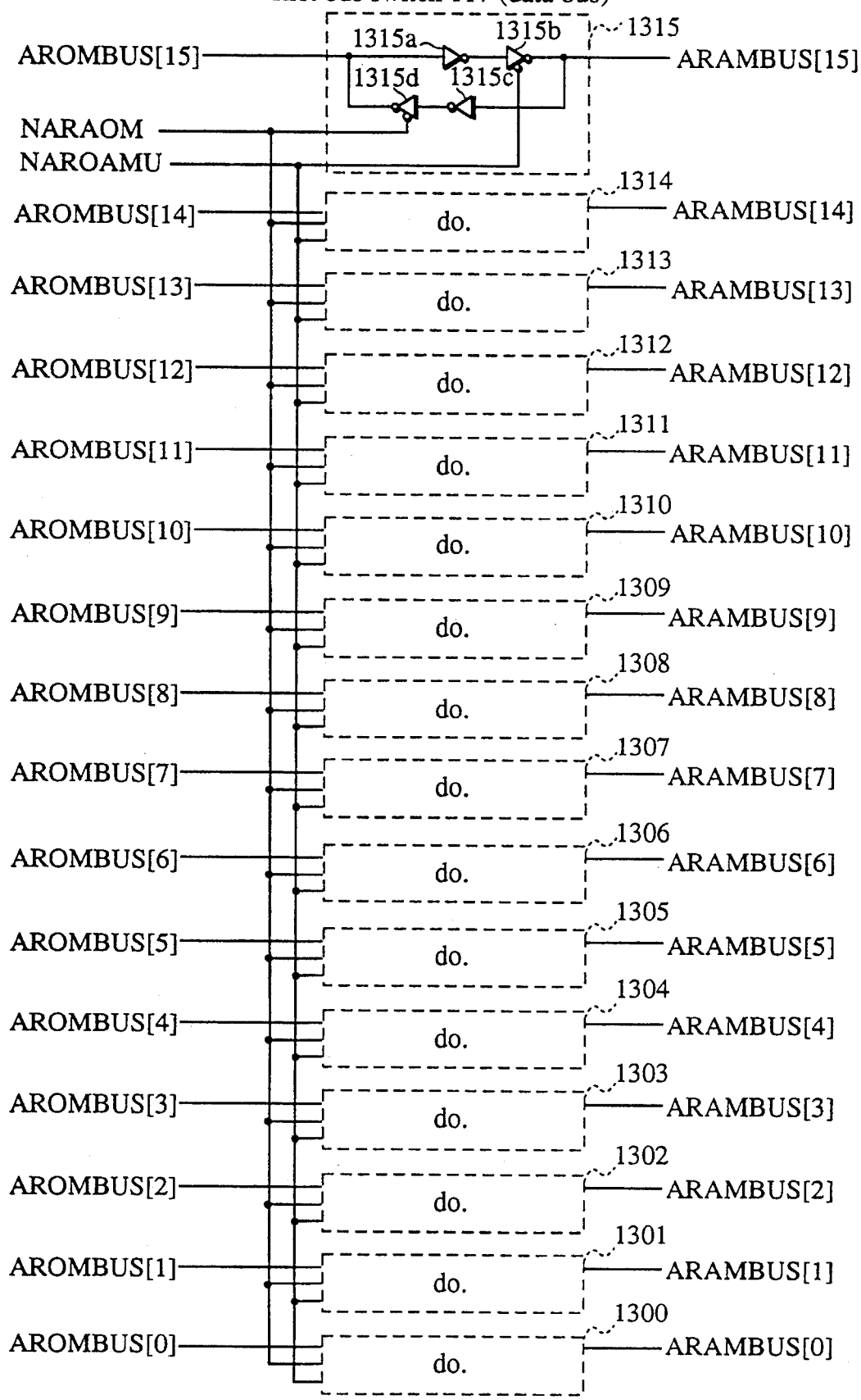
FIG. 13 is a specific circuit of a bus switch for connecting or disconnecting the internal ROM address bus and the internal RAM address bus according to the embodiment.
Figure 14:
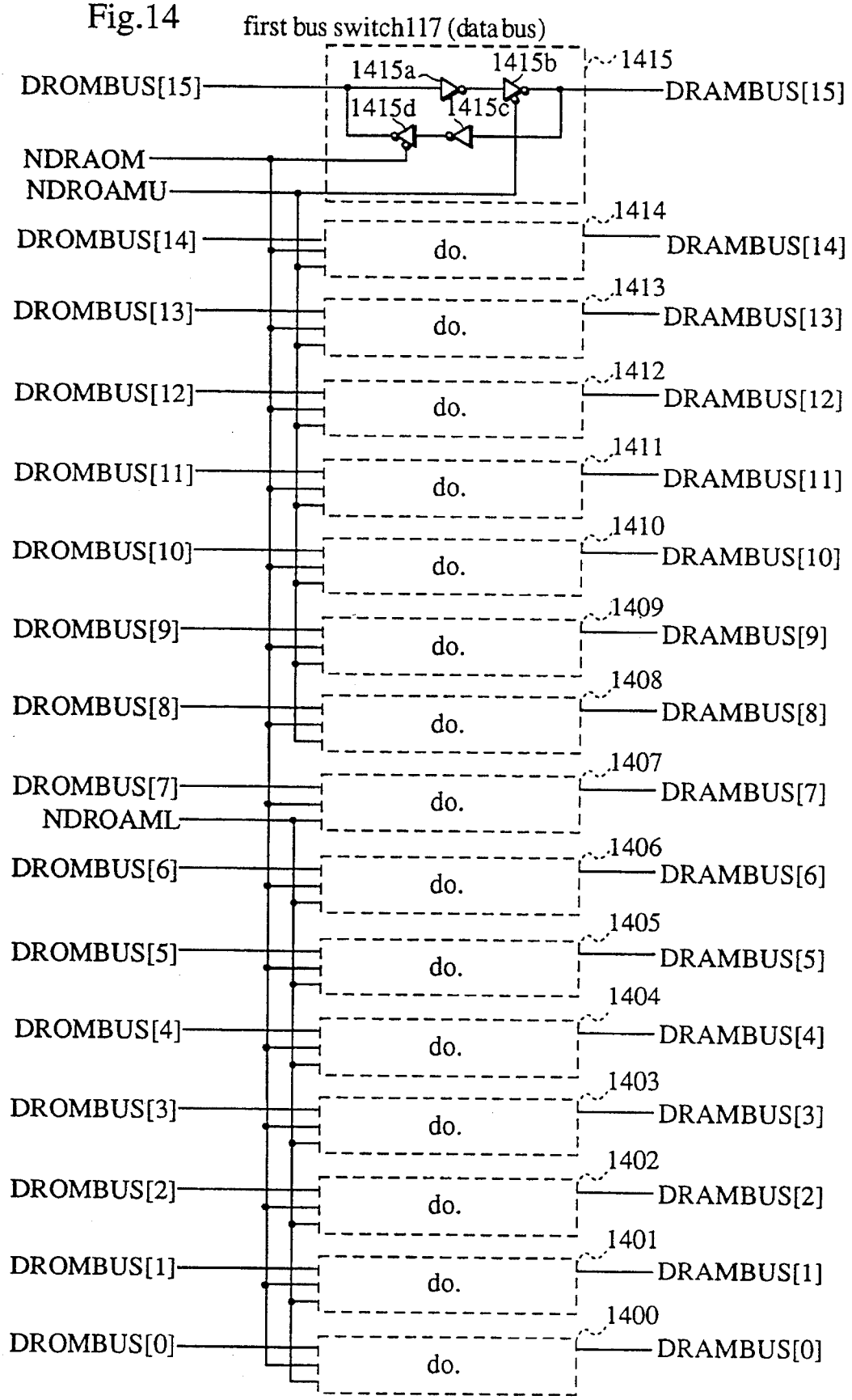
FIG. 14 is a specific circuit of a bus switch for connecting or disconnecting the internal ROM data bus and the internal RAM data bus according to the embodiment.

FIG. 13 shows a specific circuit of the first bus switch 117 to control the connection of the AROMBUS with the ARAMBUS, and FIG. 14 shows a specific circuit to control the connection of the DROMBUS with the DRAMBUS.

In FIG. 13, bidirectional one-bit line transceivers 1315–1300 drives address according to a control signal NAROAM telling to drive address from the AROMBUS to the ARAMBUS or a control signal NARAOM telling to drive address from the ARAMBUS to the AROMBUS. Each of these sixteen transceivers has the same construction except for their bit positions.

The line transceiver 1315 consists of four line buffers 1315a–1315d. When the NAROAM is asserted, the line buffer 1315b drives bit 15 on the AROMBUS[15] inputted by way of the line buffer 1315a to the ARAMBUS[15]. When the NARAOM is asserted, the line buffer 1315d drives bit 15 on the ARAMBUS[15] inputted by way of the line buffer 1315c to the AROMBUS[15]. The other line transceivers 1314–1300 operate in the same manner.

In FIG.14, bidirectional one-bit line transceivers 1415–1400 drives data according to control signals NDROAMU and NDRAOM telling to drive data from the DROMBUS to the DRAMBUS or a control signal NDRAOMU and NDRAOM telling to drive data from the DRAMBUS to the DROMBUS. Each of these sixteen transceivers has the same construction except for their bits.

The line transceiver 1415 consists of four line buffers 1415a–1415d. When the NDROAMU is asserted, the line buffer 1415b drives bit 15 on the DROMBUS[15] inputted by way of the line buffer 1415a to the DRAMBUS[15]. When the NDRAOM is asserted, the line buffer 1415d drives bit 15 on the DRAMBUS[15] inputted by way of the line buffer 1415c to the DROMBUS[15]. The other line transceivers 1414–1400 operate in the same manner.

The second bus switch 118 connects or disconnects the DRAMBUS and the DPERIBUS as well as the ARAMBUS and APERIBUS.

Figure 15:
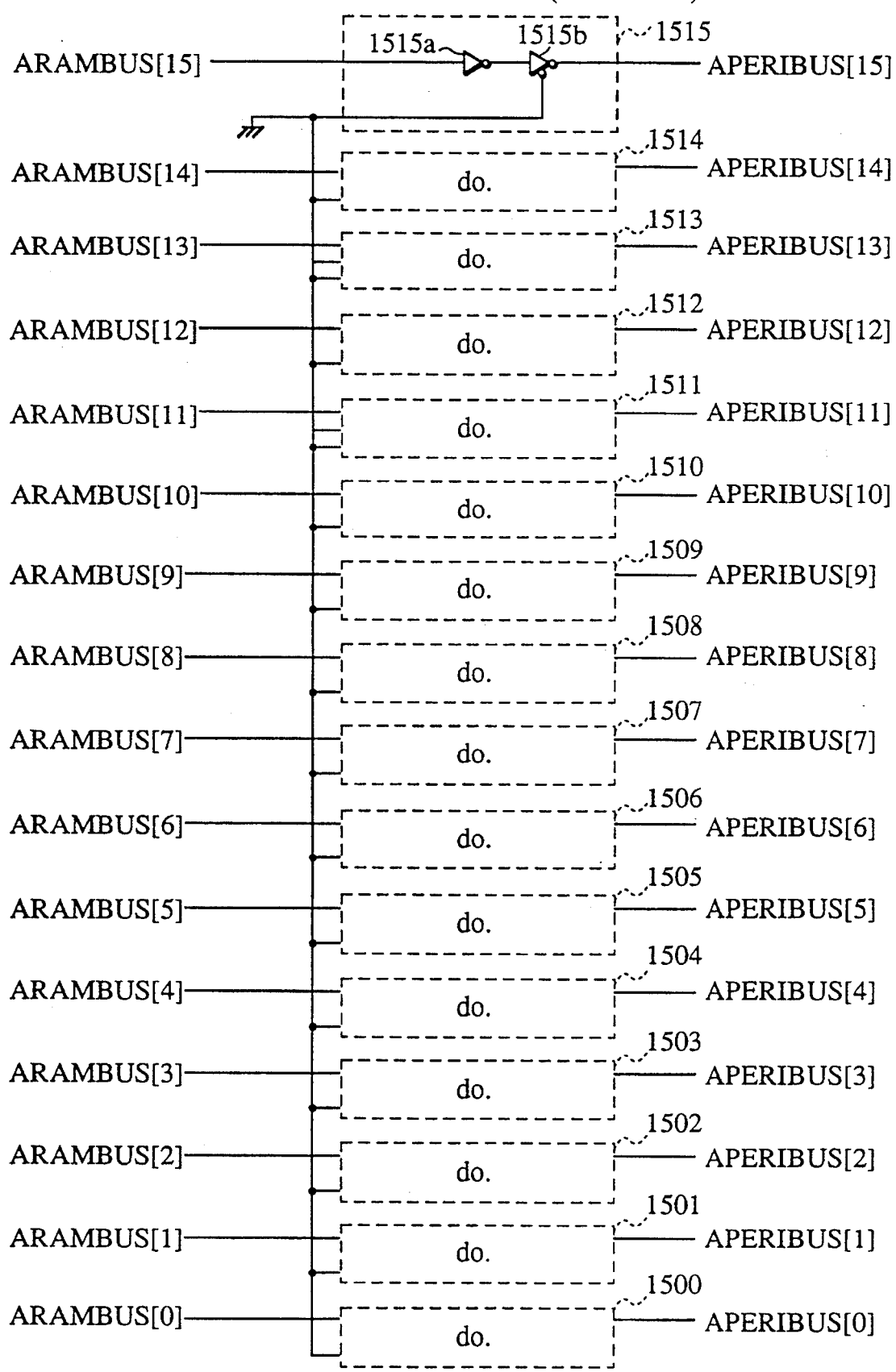
FIG. 15 is a specific circuit of a bus switch for connecting or disconnecting the internal RAM address bus and the peripheral address bus according to the embodiment.
Figure 16:
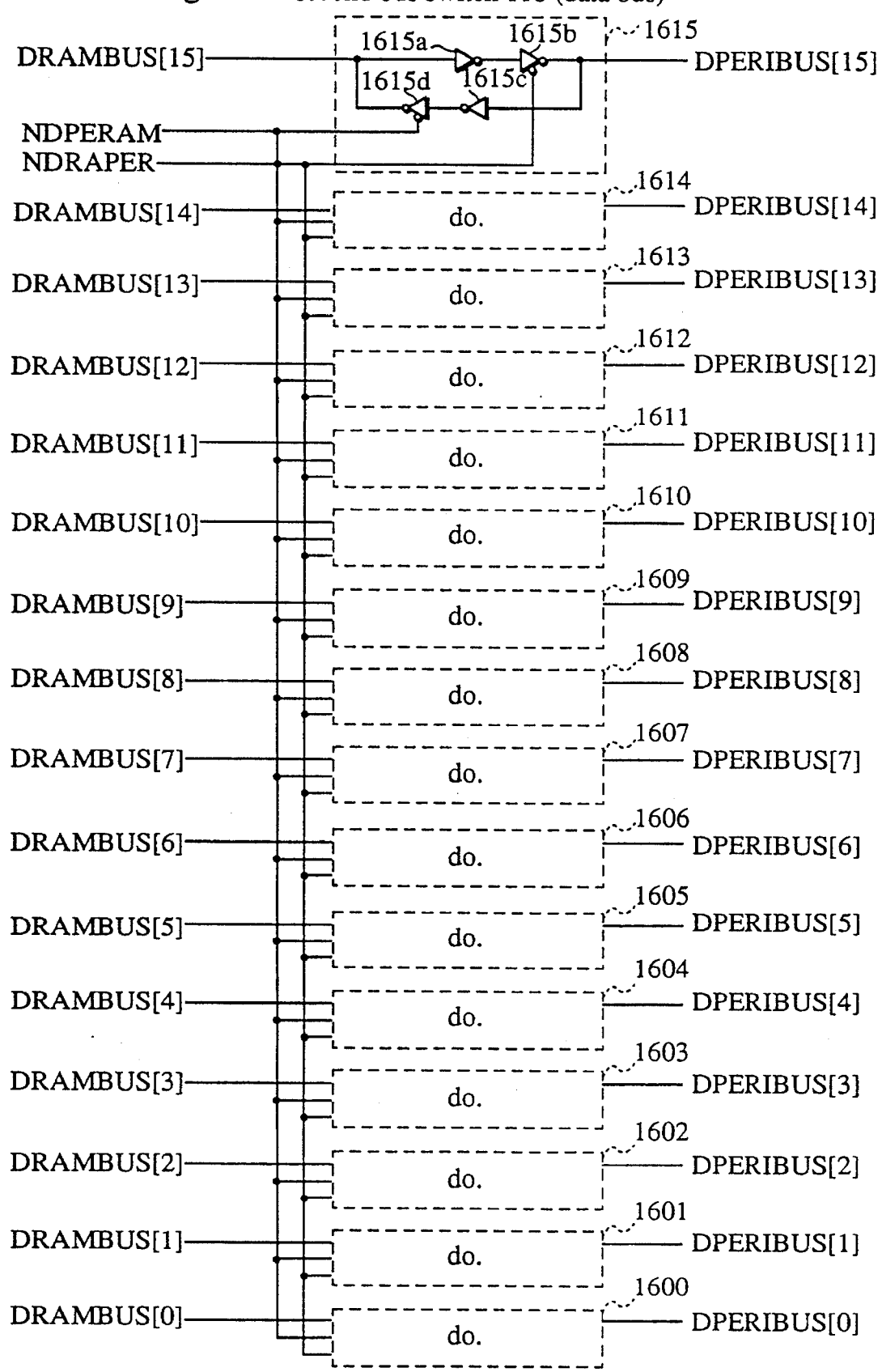
FIG. 16 is a specific circuit of a bus switch for connecting or disconnecting the internal RAM data bus and the peripheral data bus according to the embodiment.

FIGS. 15 shows a specific circuit of the second bus switch 118 to control the connection of the ARAMBUS and the APERIBUS, and FIG. 16 shows a specific circuit to control the connection of the DRAMBUS and the DPERIBUS. In the circuit of FIG.15, one-bit line drivers 1515–1500 drives address from the ARAMBUS to the APERIBUS. Each of these sixteen drivers has the same construction except for their bit positions.

The line driver 1515 consists of two line buffers 1515a–1515b. The line buffer 1515b drives bit 15 on the ARAMBUS[15] inputted by way of the line buffer 1515a to the APERIBUS[15]. The other line drivers 1514–1500 operate in the same manner.

In FIG. 16, bidirectional one-bit line transceivers 1615–1600 drives address according to a control signal NDRAPER telling to drive data from the DRAMBUS to the DPERIBUS or a control signal NDPERAM telling to drive data from the DPERIBUS to the DRAMBUS. Each of these sixteen transceivers has the same construction except for their bits.

The line transceiver 1615 consists of four line buffers 1615a–1615d. When the NDRAPER is asserted, the line buffer 1615b drives bit 15 on the DRAMBUS[15] inputted by way of the line buffer 1615a to the DPERIBUS[15]. When the NDPERAM is asserted, the line buffer 1615d drives bit 15 on the DPERIBUS[15] inputted by way of the line buffer 1615c to the DRAMBUS[15]. The other line transceivers 1614–1600 operate in the same manner.

The bus control unit 120 controls latch of the buffers 111–115, access to the on-chip resources and to external buses, as well as connecting/disconnecting operations of the external bus I/F unit 116 and of the first/second switches 117/118.

Figure 4:
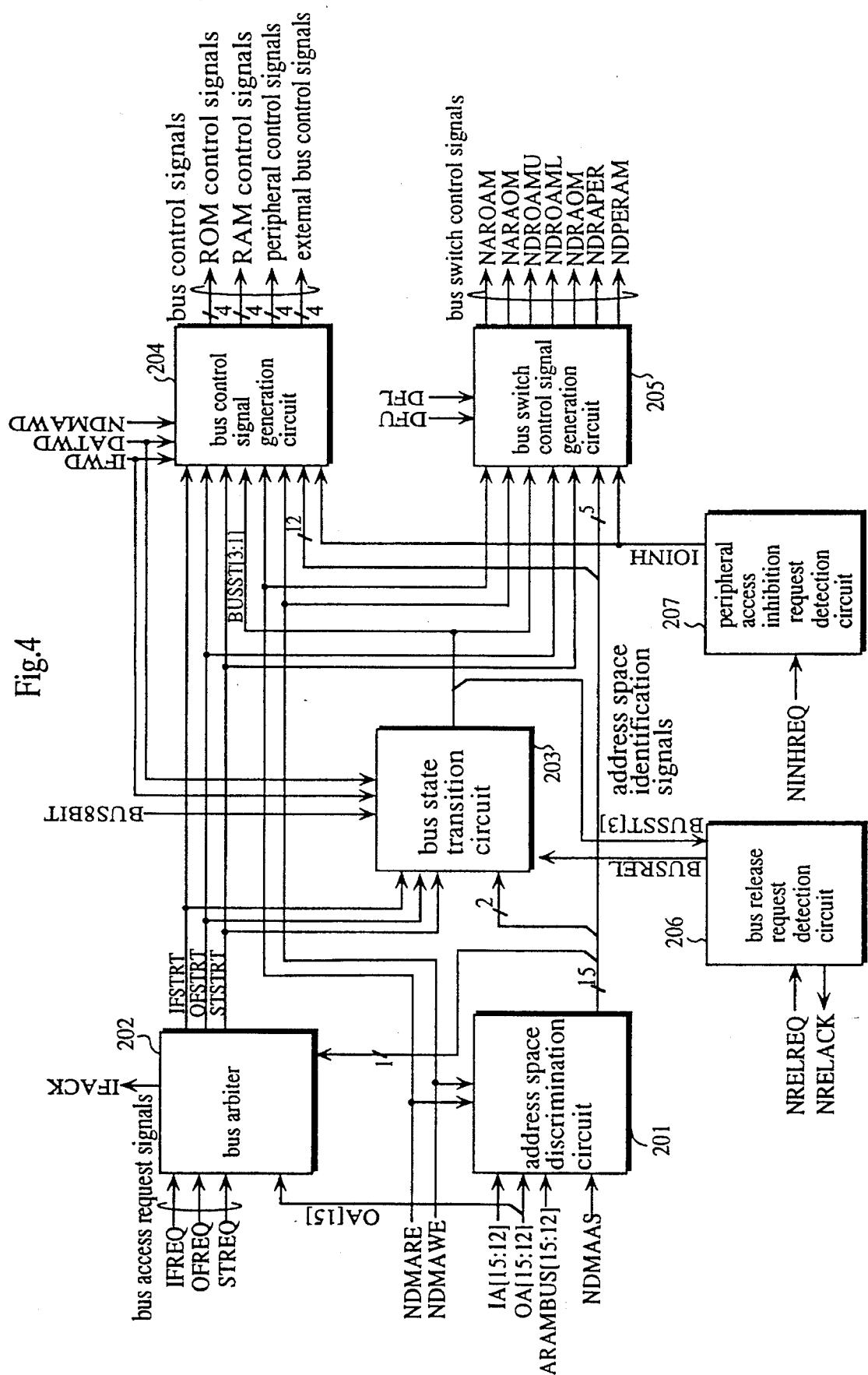
FIG. 4 is a block diagram showing the construction of the bus control unit appeared in FIG. 3.

A more detailed construction of the bus control unit 120 is shown in the diagram of FIG. 4.

In the diagram, an address space discrimination circuit 201 decodes an instruction address inputted from the PC unit 102, an operand address from the data path unit 103, and address from the external bus I/F unit 116, ARAMBUS, or APERIBUS. The circuit 201 then asserts at least one of the address space identification signals, which tell which unit of the on-chip or off-chip resources is accessed.

Figure 12:
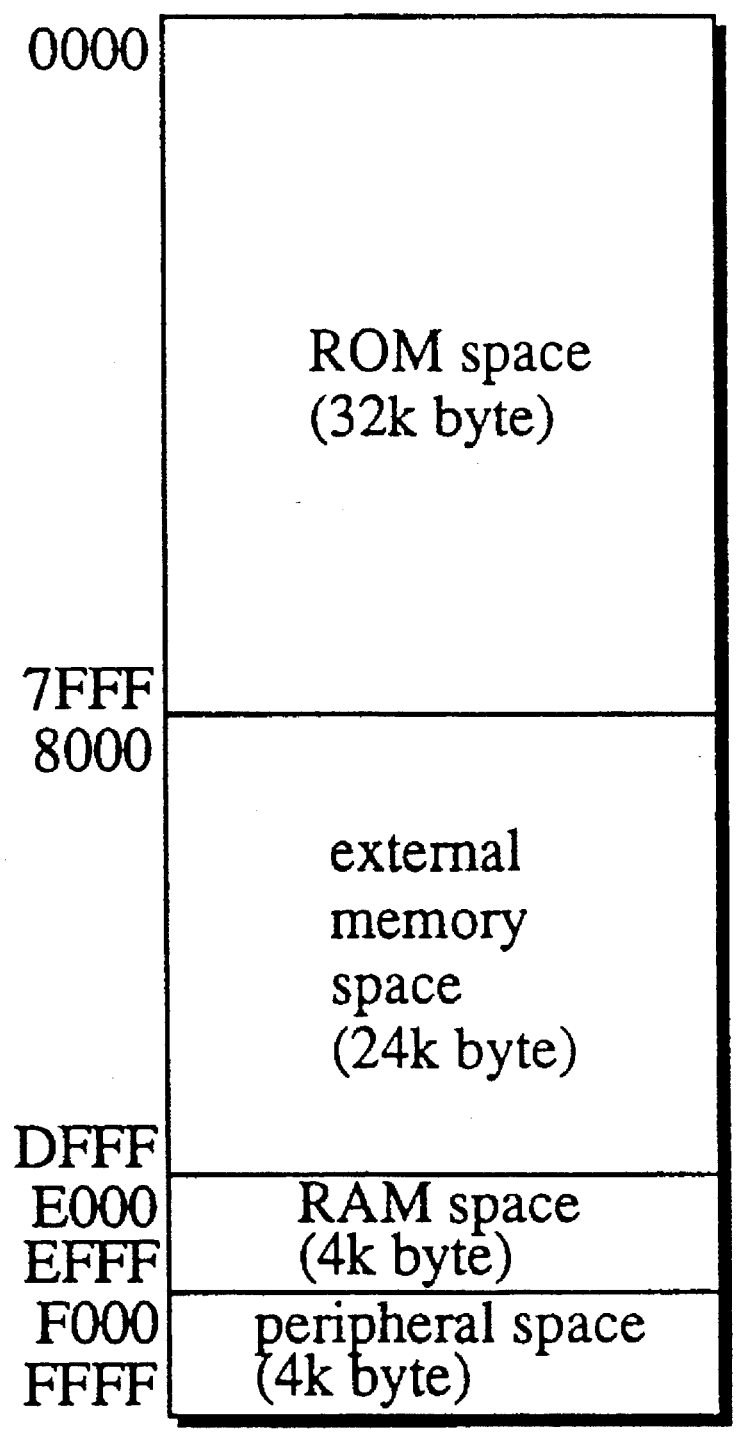
FIG. 12 is an example of the memory map showing assignment of memory space according to the first embodiment of this invention.

An address mapping of the embodiment is shown in FIG. 12. In this embodiment, all the address/data buses have 16-bit lengths. As shown in the map, the total 64-kbyte address space is divided into 32-kbyte (0000H-7HFFH), 24-kbyte (8000H-DFFFH), 4-kbyte (E000H-EFFFH), and 4-kbyte (F000H-FFFFH) respectively assigned to the internal ROM 104, an external memory (not shown), the internal RAM 105, and the internal peripherals 106.

A specific circuit of the address space discrimination circuit 201 is shown in FIG. 5.

Gates 501–505 decode an instruction address, based on its high-order 4 bits (IA[15:11]) to identify with the space in the map of FIG. 12.

Latches 506–509 output the results of the gates 501–505 respectively as IROM1, IROM2, IRAM1, IPERI1, IEXT1, and IEXT2, which are address space identification signals by synchronizing with a clock signal CK1. These signals all indicate access from the PC unit 102: the IROM1 and IROM2 to be asserted in different timing from each other indicate access to the internal ROM 104. The IRAM1 and IPERI1 indicate access to the internal RAM 105 and internal peripherals 106 respectively. The IEXT1 and IEXT2 to be asserted in different timing from each other indicate access to the external memory.

Gates 511–515 decode an operand address, based on its high-order 4 bits (OA[15:11]) to identify with the space in the map of FIG. 12.

Latches 516–519 output the results of the gates 511–515 as DROM1, DRAM1, DPERI1, DEXT1, and DEXT2 which are address space identification signals by synchronizing with a clock signal CK1. These signals all indicate access from the data path unit 103; the DROM 1, DRAM1, and DPERI1 indicate access to the internal ROM 104, internal RAM 105 and internal peripherals 106 respectively. The DEXT1 and DEXT2 to be asserted in different timing from each other indicate access to the external memory.

Latches 521–524 latch the high-order 4 bits of an address inputted from, for instance, the external DMAC (not shown) by way of the external bus I/F unit 116 and the ARAMBUS, under control of an address strobe signal (NDMAAS) inputted from the external DMAC by way of a NOT-gate 520.

Gates 525–530 decode the high-order 4 bits (ARAMBUS [15:11]) of an address outputted from the latches 521–524 to identify with the space in the map of FIG. 12, when either a write enable signal (NDMAWE) or a read enable signal (NDMARE) is asserted.

Latches 531–534 output the results of the gates 511–515 as EROM1, ERAM1, EPERI1, and EEXT1 which are address space identification signals by synchronizing with the clock signal CK1. The EROM1, ERAM1, EPERI1, EEXT1 indicate access from the external DMAC respectively to the internal ROM 104, internal RAM 105, internal peripherals 106 and external memory.

A bus arbiter 202, if an instruction fetch request signal (IFREQ) is inputted from the PC unit 102 and also a load request signal (operand fetch request signal) (OFREQ) and a store request signal (STREQ) are inputted from the data path unit 103. Then the bus arbiter 202, if only one of these three control signals is asserted, asserts one or more access start signals: IFSTRT and IFACK; OFSTRT; or STSRTR respectively. When the IFREQ and another request signal are asserted at the same time, causing a bus conflict, the bus arbiter 202 arbitrates the conflict and asserts access start signals corresponding to the asserted request signals one by one or at the same time, based on the arbitrated results. The above-mentioned IFSTRT, OFSTRT, STSTRT, and IFACK indicate a start of an instruction fetch, a start of operand data load, a start of operand data store, and an acknowledgement of an instruction fetch request respectively.

Figure 6:
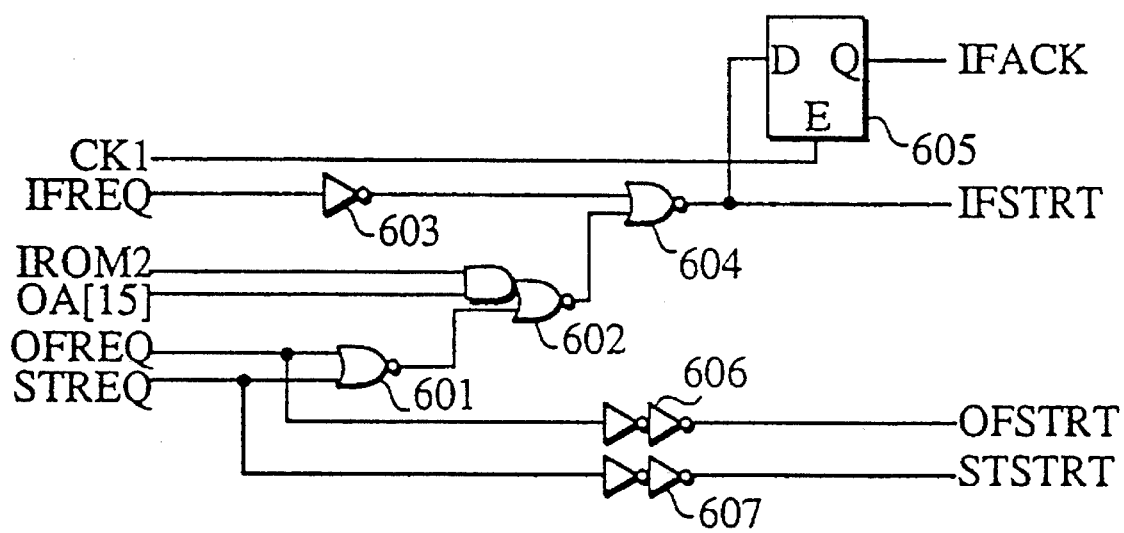
FIG. 6 is an example of the bus arbiter of the bus control unit appeared in FIG. 4.

A specific circuit of the bus arbiter 202 is shown in FIG. 6. The bus arbiter 202 consists of gates and a latch as follows:

Gates 601 and 602, in response of the input of the IROM2, OA[15], OFREQ, and STREQ, judge whether the instruction decoder 101 and the PC unit 102 are requesting an instruction fetch to other than the internal ROM 104, or whether the data path unit 103 is requesting data load/store to the internal RAM 105, and, depending on the judged results, inhibits the NOR-gate 604 to output the IFSTRT.

Gates 603 and 604, if the IFREQ and the results judged by the gates 601 and 602 are inputted and the results are turned out to be negative, and if the IFREQ is asserted, then asserts the IFSTRT. On the other hand, when the results are turned out to be positive, the gates 603 and 604 do not assert the IFSTRT until data load/store is over, even if the IFREQ is asserted.

A latch 605 outputs the IFSTRT as IFACK by synchronizing with a clock signal CK1.

A gate 606 asserts the OFSTRT when the OFREQ is inputted and asserted.

Finally, a gate 607 asserts the STSTRT when the STREQ is inputted and asserted.

A bus state transition circuit 203 controls bus access in response to the access start signals (IFSTRT, OFSTRT, STSTRT) inputted from the bus arbiter 202, the address space identification signals (IEXT2, DEXT2) from the address space discrimination circuit 201, and DATWD and BUS8BIT from the data path unit 103. The DATWD indicates a 16-bit word and the BUS8BIT is a mode which indicates to be effective only for the high-order 8 bits (D[15:8]) of an external data bus (D[15:0]). The circuit 203 then outputs a 4-bit signal BUSST[3:0] indicating a bus state. In this embodiment, the BUS8BIT is negated.

FIG. 19 shows a list of bus states, which are shown in BUSST[3:0]. As shown on the list, eight out of sixteen combinations are assigned, the other eight combinations remain reserved.

Each bit mainly represents the following:

When BUSST[O] is a 1, a first byte of a 16-bit instruction or data is being transferred, and when that is a 0, a second byte of the 16-bit instruction or data or a 16-bit word is being transferred. When BUSST[1] is a 1, operand data is being transferred and otherwise no operand data is being transferred. When BUSST[2] is a 1, an instruction is being transferred, and otherwise no instruction is being transferred. When BUSST[3] is a 1, the bus is released to the external DMAC, and otherwise the bus is occupied by an internal component.

Figure 7:
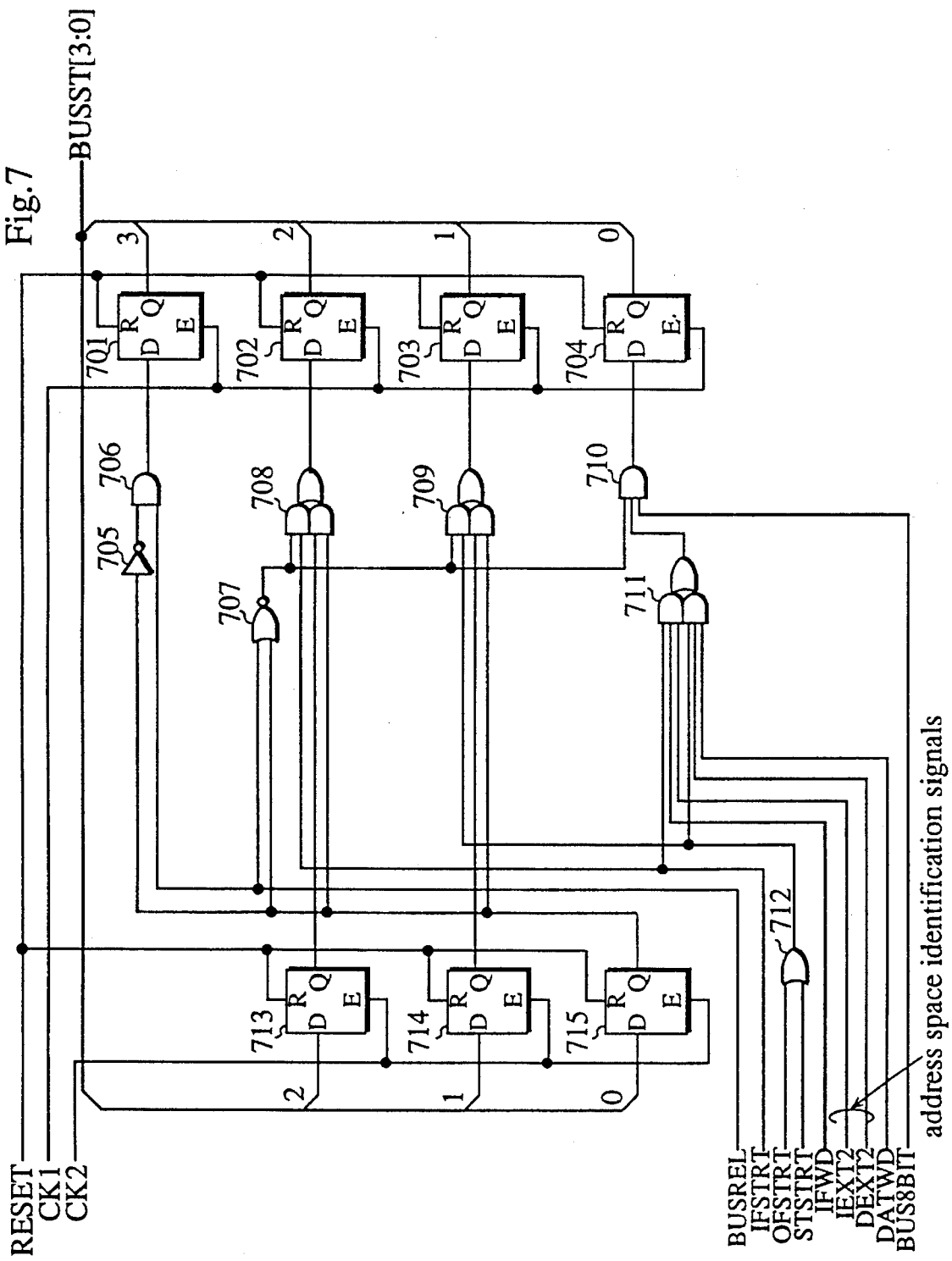
FIG. 7 is an example of the bus state transition circuit of the bus control unit appeared in FIG. 4.

A specific circuit of the bus state transition circuit 203 is shown in FIG. 7. The circuit 203 consists of latches and gates as follows:

Latches 701–704 latch the BUSST[3]-BUSST[0] in synchronization with the clock signal CK1 and output them.

Latches 713–715 latch a bus state signal BUSST[2:0] in synchronization with the clock signal CK2.

Gates 705–712, which form a combination circuit, receive the access start signals (IFSTRT, OFSTRT, STSTRT), the address space identification signals (IEXT2, DEXT2), access size indication signals (IFWD, DATWD, BUS8BIT), bus release request signal (BUSREL), and the contents latched in the latches 713– 715. Bus states are determined in response to these signals, and outputted to the latches 701–704.

A bus control signal generation circuit 204 discriminates a subject and an object of access, based on the address space identification signals (EROM1, IROM1, DROM1, ERAM1, DRAM1, EPERI1, IPERI1, DPERI1, EEXT1, IEXT1, DEXT1) inputted from the address space discrimination circuit 201, the access start signals (IFSRT, OFSTRT, STSTRT) from the bus arbiter 202, the bus state signals (BUSST[3:1]) from the bus state transition circuit 203, external signals (NDMARE, NDMAWE, NDMAWD) and a peripheral access inhibition signal (IOINH) from the external DMAC. The circuit 204 then outputs at least one of the following bus control signals in order to perform access in response to the discriminated results. The bus control signals are: ROM bus control signals (NROMAS, NROMRE, NROMWE, NROMWD), RAM bus control signals (NRAMAS, NRAMRE, NRAMWE, NRAMWD), peripheral bus control signals (NPERIAS, NPERIRE, NPERIWE, NPERIWD), and external bus control signals (NEXTAS, NEXTRE, NEXTWE, NEXDTWE). The last two characters AS, RE, WE, and WD of these signals respectively indicate the signal is an address strobe signal, a read enable signal, a write enable signal, and a signal telling its address being one word (16 bits) in length.

Figure 8:
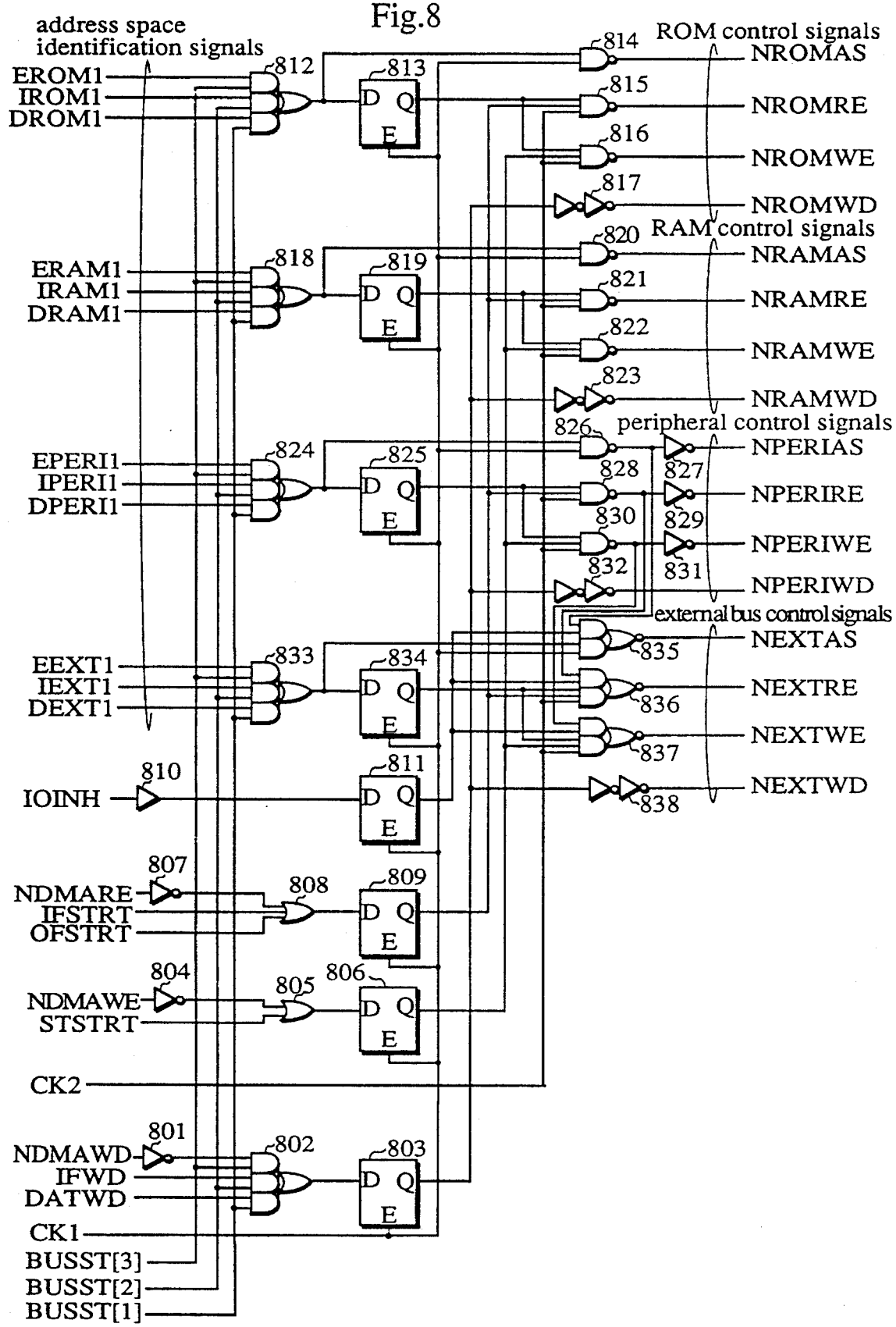
FIG. 8 is an example of the bus control signal generation circuit of the bus control unit appeared in FIG. 4.

A specific circuit of the bus control signal generation circuit 204 is shown in FIG. 8. The circuit 204 consists of the following:

Gates 801, 802 and a latch 803 cooperate to find access size, based on NDMAWD, IFWD, DATWD and BUSST [3:1], and the results are outputted in synchronization with the clock signal CK1 through the output Q of the latch 803. The output 0 and 1 respectively indicate word access and byte access.

Gates 804–805 and 807–808 and latches 806 and 809 cooperate to discriminate between a write and a read, based on NDMAWE, STSTRT, NDMARE, IFSTRT, and OFSTRT. The results are outputted in synchronization with the clock signal CK1 through the outputs Q of the latches 806 and 809. The output "1" of the latch 806 indicates a write while the output "1" of the latch 809 indicates a read, both of which may be outputted concurrently.

A gate 810 and a latch 811 cooperate to detect whether external access to the internal peripherals 106 is inhibited or not. More specifically, when IOINH is asserted, the latch 811 outputs a signal telling access is inhibited in synchronization with the clock signal CK1. The output Q will output "1" to indicate the inhibition.

Controlling Access to the Internal ROM 104

The following units 812–817 cooperate to generate a signal controlling access to the internal ROM 104:

The AND-OR gate 812 detects access to the internal ROM 104, based on EROM1, IROM1, DROM1, and BUSST[3:1]. The latch 813 outputs the detected results in synchronization with the clock signal CK1 through its output Q.

Responding to the results of the AND-OR gate 812, the NAND gate 814 outputs an address strobe signal (NROMAS) in the timing of the clock signal CK1.

Receiving the output of the latch 813, the NAND gate 815 outputs a read enable signal (NROMRE) in the timing of the clock signal CK2, provided that the output Q of the latch 809 indicates a read.

In the same manner, receiving the output of the latch 813, the NAND gate 816 outputs a write enable signal (NROMWE) in the timing of the clock signal CK2, provided that the output Q of the latch 806 indicates a write.

The buffer gate 817 consisting of two NOT gates receives a signal indicating access size from the latch 803 and outputs it as NROMWD.

Controlling Access to the Internal RAM 105

The following units 818–823 cooperate to generate a signal controlling access to the internal RAM 105:

The AND-OR gate 818 detects access to the internal RAM 105, based on ERAM1, IRAM1, DRAM1, and BUSST[3:1]. The latch 819 outputs the detected results in synchronization with the clock signal CK1 through its output Q.

Responding to the results of the AND-OR gate 818, the NAND gate 820 outputs an address strobe signal (NRAMAS) in the timing of the clock signal CK1.

Receiving the output of the latch 819, the NAND gate 821 outputs a read enable signal (NRAMRE) in the timing of the clock signal CK2, provided that the output Q of the latch 809 indicates a read.

In the same manner, receiving the output of the latch 819, the NAND gate 822 outputs a write enable signal (NRAMWE) in the timing of the clock signal CK2, provided that the output Q of the latch 806 indicates a write.

The buffer gate 823 consisting of two NOT gates receives a signal indicating access size from the latch 803 and output it as NRAMWD.

Controlling Access to the Internal Peripherals 106

The following units 824–832 cooperate to generate a signal controlling access to the internal peripherals 106:

The AND-OR gate 824 detects access to the internal peripherals 106, based on EPERI1, IPERI1, DPERI1, and BUSST[3:1]. The latch 825 outputs the detected results in synchronization with the clock signal CK1 through its output Q.

Responding to the results of the AND-OR gate 824, the AND gate 826 outputs an address strobe signal (NPERIAS) through the NOT gate 827 in the timing of the clock signal CK1.

Receiving the output of the latch 825, the AND gate 828 outputs a read enable signal (NPERIRE) through the NOT gate 829 in the timing of the clock signal CK2, provided that the output Q of the latch 809 indicates a read.

In the same manner, receiving the output of the latch 825, the AND gate 830 outputs a write enable signal (NPERIWE) through the NOT gate 831 in the timing of the clock signal CK2, provided that the output Q of the latch 806 indicates a write.

The buffer gate 832 consisting of two NOT gates receives a signal indicating access size from the latch 803 and outputs it as NPERIWD.

Controlling External Access Through the External Bus I/F Unit 116

The following units 833–838 cooperate to generate a signal controlling access to an external circuit through the external bus I/F unit 116:

The AND-OR gate 833 detects access to an external circuit, based on EEXT1, IEXT1, DEXT1, and BUSST[3:1]. The latch 834 outputs the detected results in synchronization with the clock signal CK1 through its output Q.

Responding to the results of the AND-OR gate 833, the AND-NOR gate 835 outputs an address strobe signal (NEXTAS) in the timing of the clock signal CK1.

Receiving the output of the latch 834, the AND-NOR gate 836 outputs a read enable signal (NEXTRE) in the timing of the clock signal CK2, provided that the output Q of the latch 809 indicates a read.

In the same manner, receiving the output of the latch 834, the AND-NOR gate 837 outputs a write enable signal (NEXTWE) in the timing of the clock signal CK2, provided that the output Q of the latch 806 indicates a write.

When the output Q of the latch 811 inhibits access to the internal peripherals 106, if the peripheral control signals (NPERIAS, NPERIRE, NPERIWE) are asserted, then the AND-NOR gates 835–837 assert the external bus control signals (NEXTAS, NEXTRE, NEXTWE) concurrently with the corresponding peripheral control signals, responding to the output of the corresponding AND gates 826, 828, and 830.

The buffer gate 838 consisting of two NOT gates receives a signal indicating access size from the latch 803 and outputs it as NEXTWD.

A bus switch control signal generation circuit 205 receives an address space identification signals (DROM1, EROM1, DPERI1, IPERI1, IROM1), bus state signals (BUSST[3:1]), signals (DFU, DFL) directing a byte-to-byte connection between the DROMBUS and the DRAMBUS, control signals (NDMARE, NDMAWE) to be sent from the external DMAC, the access start signals (STSTRT, OFSTRT), and the IOINH telling to inhibit the operation of the internal peripherals 106. The circuit 205 then generates bus switch control signals so as to control the first and second bus switches 117 and 118 according to the received signals. In this embodiment, the DFU, DFL, and IOINH are fixed to low level and will never be asserted.

Figure 9:
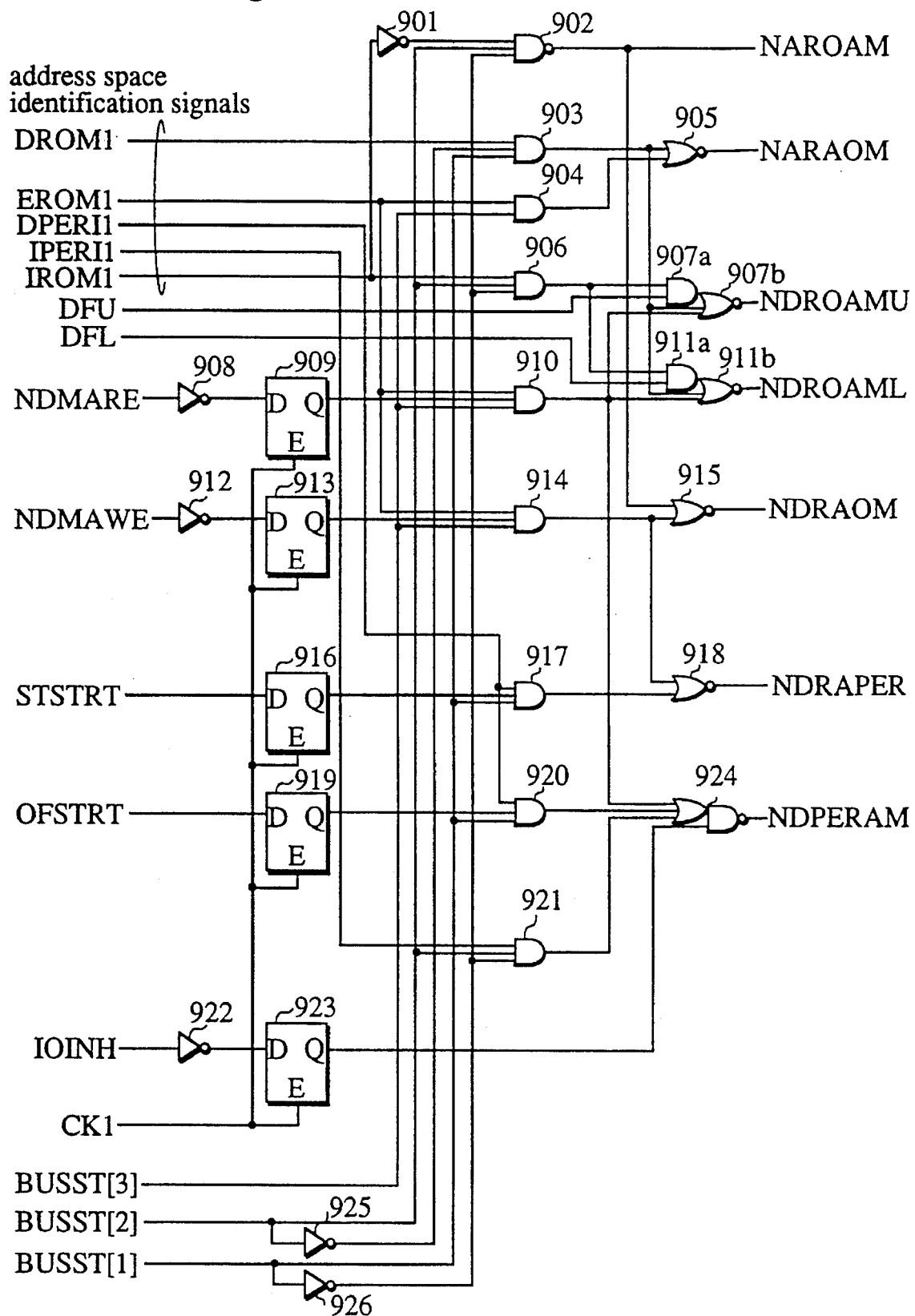
FIG. 9 is an example of the bus switch control signal generation circuit of the bus control unit appeared in FIG. 4.

A specific circuit of the bus switch control signal generation circuit 205 is shown in FIG. 9.

Gates 901–905 forms a circuit which generates the NAROAM and NARAOM which control address bus connecting/disconnecting operations of the first bus switch 117 and address flow directions, based on the address space identification signals (DROM1, EROM1, IROM1), and the bus state signals (BUSST[3:1]).

The NAROAM controls address flow from the AROMBUS to the ARAMBUS and is asserted by the NAND gate 902 when the NAND gate 902 detects that instruction fetch to other than the internal ROM 104 is performed (IROM1=0 and BUSST[2:1]=10).

The NARAOM controls address flow from the ARAMBUS to the AROMBUS and is asserted by the NOR gate 905 if the NOR gate 905 detects that only operand fetch to the internal ROM 104 is being performed (DROM1=0 and BUSST[2:1]=01) or of the AND-gate 904 detects that access from the external DMAC is being performed to the internal ROM 104 if the bus is in a released state (EROM1=1 and BUSST[3:1]=1).

Gates 906–915 forms a circuit which generates NDROAMU, NDROAML and NDRAOM, which control data bus connecting/disconnecting operations of the first bus switch 117 and data flow directions, based on IROM1, DFU, DFL, NDMARE, NDMAWE, and the bus state signals (BUSST[3:1]).

The NDROAMU controls to transfer data from the high-order byte of the DROMBUS to the high-order byte of the DRAMBUS. The NDROAMU is asserted by the NOR-gate 907b when the AND gate 903 detects DROM1=1 and BUSST[2:1]=01 mentioned before, when the AND gates 906 and 907a detect that the DFU is asserted and only instruction fetch is being performed to the internal ROM 104 (IROM1=0, BUSST[2:1]=10 and DFU=1), or when the AND gate 910 detects that data load from the external DMAC to the internal ROM 104 is being performed (EROM1=1, the output Q of the latch 909 is one, and BUSST[3]=1).

The NDROAML controls to transfer data from the low-order byte of the DROMBUS to the low-order byte of the DRAMBUS. The NDROAML is asserted by the NOR gate 911b when the AND gate 903 detects DROM1=1 and BUSST[2:1]=01 mentioned before, when the AND gates 906 and 911a detect that the DFL is asserted and only instruction fetch is being performed to the internal ROM 104 (IROM1=0, BUSST[2:1]=10 and DFL=1), or when the AND gate 910 detects that data load is being performed from the external DMAC to the internal ROM 104 (EROM1=1, the output Q of the latch 909 is one, and BUSST[3]=1.

The NDRAOM controls to transfer data from the DRAMBUS to the DROMBUS. The NDRAOM is asserted by the NOR gate 915 when the AND-gate 902 detects IROM1=1 and BUSST[2:1]=10 mentioned before, or when the AND gate 914 detects that data store is being performed from the external DMAC to the internal ROM 104 (EROM1=1, the output Q of the latch 913 is one, and BUSST[3]=1).

Gates 916–924 forms a circuit which generates NDRAPER and NDPERAM which control data bus connecting/disconnecting operations of the second bus switch 118 and data flow directions, based on the STSTRT, OFSTRT, IOINH, and bus state signals (BUSST[3:1]).

The NDRAPER controls to transfer data from the DRAMBUS to the DPERIBUS. The NDRAPER is asserted by the NOR gate 918 when the AND gate 914 detects that EROM1=1, the output Q of the latch 913 is a 1, and BUSST[3:1]=1 mentioned before, or when the AND gate 917 detects that the data path unit 103 has started to store operand data to the internal peripherals 106 (DPERI1=1, the output Q of the latch 916 is one, and BUSST[1]=1).

The NDPERAM controls to transfer data from the DPERIBUS to the DRAMBUS. The NDPERAM is asserted by the OR-NAND gate 924 unless access to the internal peripherals 106 is inhibited, when the AND gate 910 detects that EROM1=1, the output Q of the latch 909 is a 1, and BUSST[3]=1 mentioned before, when the AND gate 920 detects that the data path unit 103 has started to load operand data to the internal peripherals 106 (DPERI1=1, the output Q of the latch 919 is one, and BUSST[1]=1), or when the AND gate 921 detects that only instruction is being transferred from the PC unit 102 to the internal peripherals 106 (IPERI1=1 and BUSST[1]=1).

A bus release request detection circuit 206 detects a signal NRELREQ requesting to release these internal buses: AROMBUS[15:0], DROMBUS[15:0], DRAMBUS[15:0], ARAMBUS[15:0], APERIBUS[15:0], DRPERIBUS[15:0] so that external circuits can access the internal hardware resources. The circuit 206 outputs a signal BUSREL directing bus release.

Figure 10:
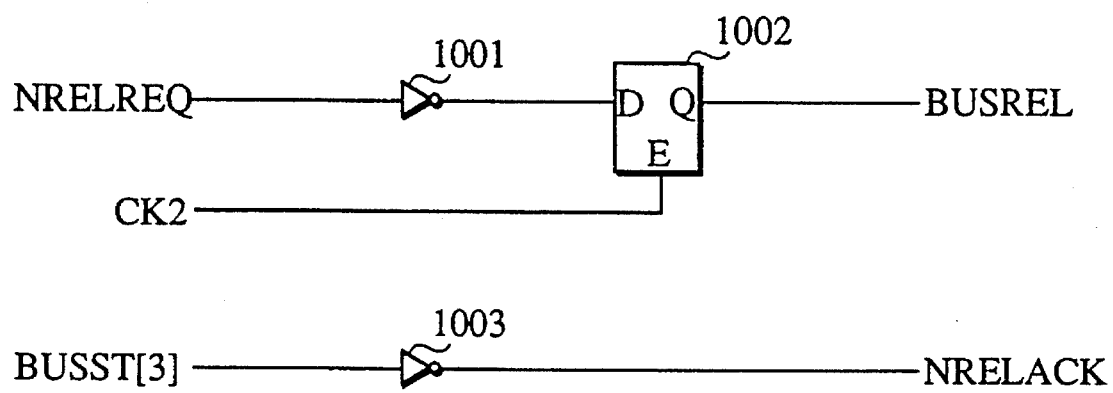
FIG. 10 is an example of the bus release request detecting circuit of the bus control unit appeared in FIG. 4.

A specific circuit of the bus release request detection circuit 206 is shown in FIG. 10. The NRELREQ outputted from an external circuit is inputted to the latch 1002 through a NOT gate 1001, and outputted as a BUSREL in synchronization with the clock signal CK2. When the BUSST[3] indicating the bus release state inputted from the bus state transition circuit 203 becomes a 1, the NOT gate 1003 asserts a control signal NRELACK telling to acknowledge the bus release request outputted from an external circuit.

A peripheral access inhibition request detection circuit 207 detects a signal NINHREQ requesting inhibition of the use of the internal peripherals 106 and outputs the IOINH directing to inhibit the use.

Figure 11:
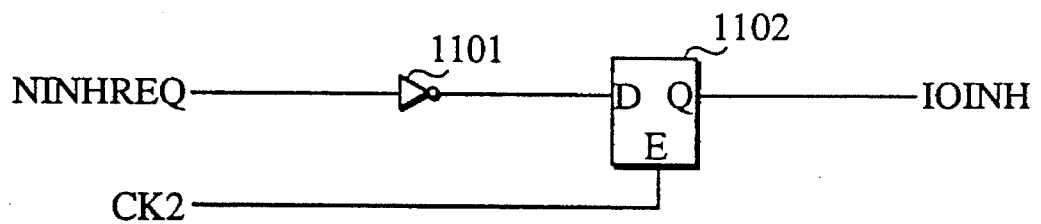
FIG. 11 is an example of the peripheral access inhibition request detecting circuit of the bus control unit appeared in FIG. 4.

A specific circuit of the peripheral access inhibition request detection circuit 207 is shown in FIG. 11. As shown in the circuit, the NINHREQ outputted from an external circuit is inputted to the latch 1102 through the NOT gate 1101 and is outputted as the IOINH in synchronization with the clock signal CK2.

Figure 17:
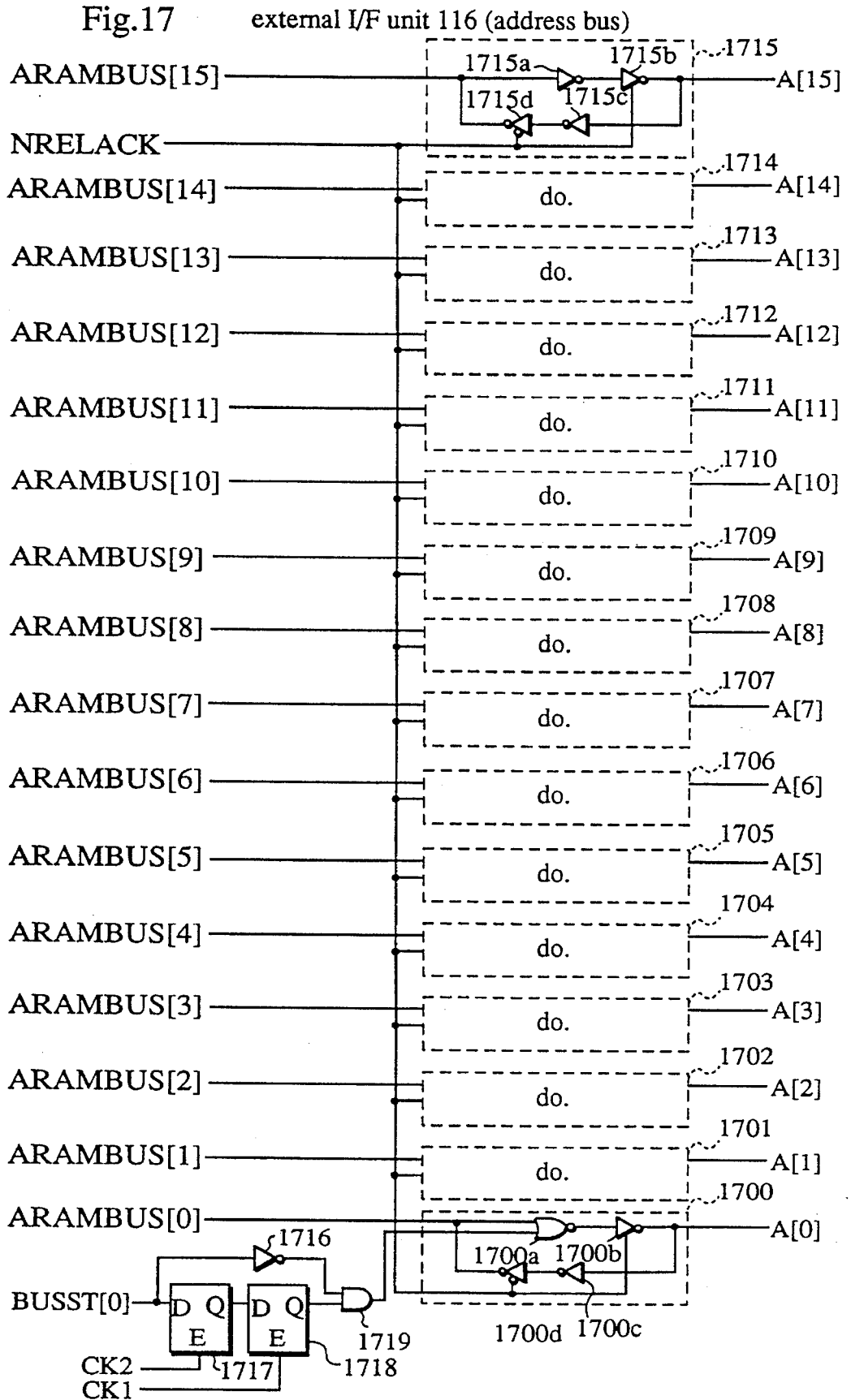
FIG. 17 is a specific circuit of a bus switch for connecting or disconnecting the internal RAM address bus and the external address bus according to the embodiment.
Figure 18:
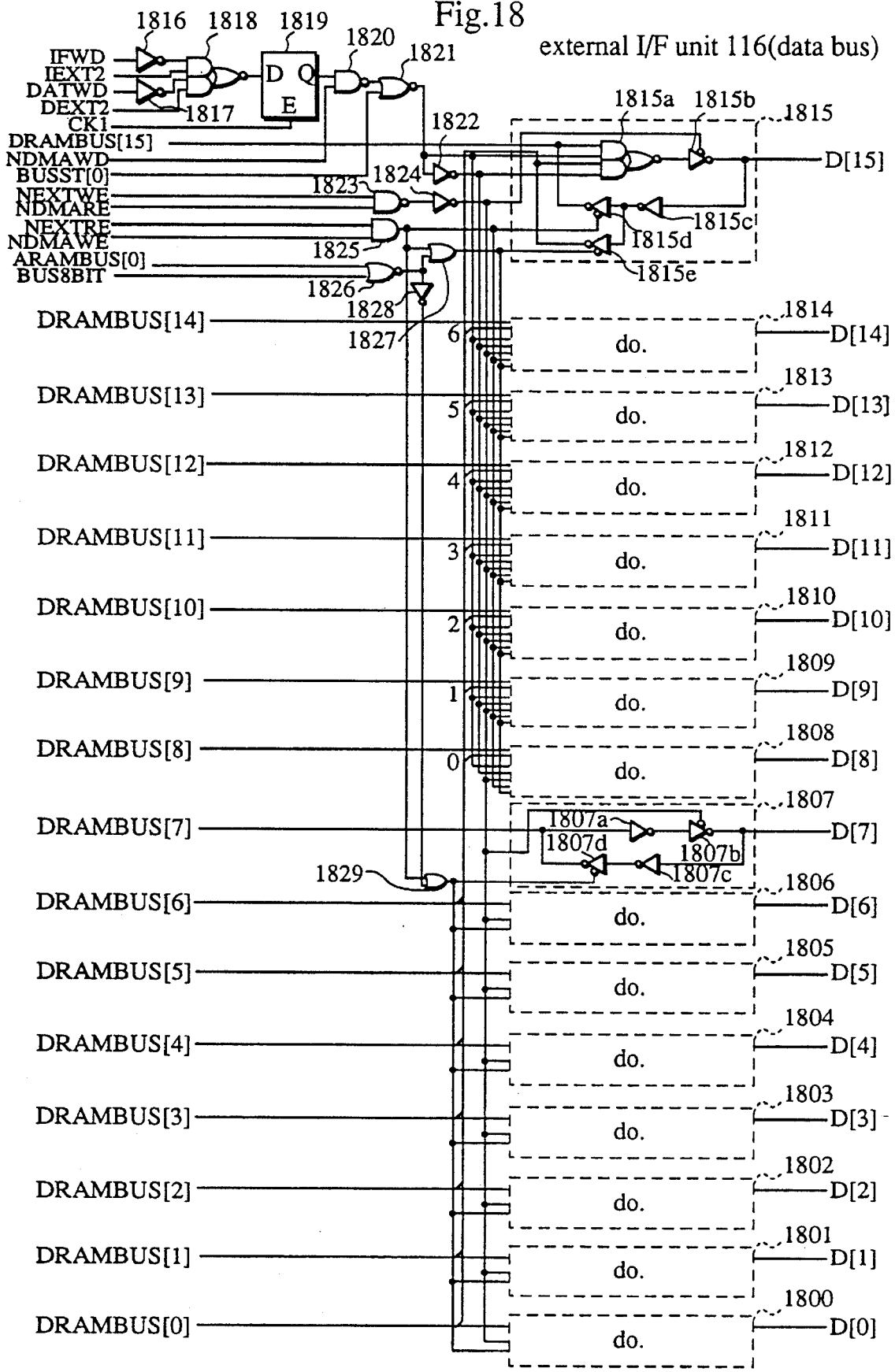
FIG. 18 is a specific circuit of a bus switch for connecting or disconnecting the internal RAM data bus and the external data bus according to the embodiment.

FIGS. 17 shows a specific circuit of the external bus I/F unit 116 to control connecting/disconnecting operations between the ARAMBUS and the A bus, and FIG. 18 shows a specific circuit to control connecting/disconnecting operations between the DRAMBUS and the D bus.

In FIG. 17, bidirectional one-bit line transceivers 1715–1700 drives address according to a control signal NRELACK, which indicates to acknowledge the bus release request. Each of the fifteen transceivers 1715–1701 are constructed the same except for their bit positions.

The line transceiver 1715 consists of four line buffers 1715a–1715d. When the NRELACK is not asserted, the line buffer 1715b drives bit 15 on the ARAMBUS[15] inputted through the line buffer 1715a to the A[15]. When the NRELACK is asserted, the line buffer 1715d drives bit 15 on the A[15] inputted through the line buffer 1715c to the ARAMBUS[15]. The other line transceivers 1714–1701 operate in the same manner.

In a circuit composed of units 1716–1719, when a width of the external data bus is 8 bits and the first byte of a 16-bit instruction or data is transferred at one previous bus cycle (BUSST[0]=1), the latches 1717 and 1718 hold the value (=1), and the value (=1) is outputted from the AND gate 1719 in the timing of the clock CK1 in the next cycle.

The line transceiver 1700 consists of a NOR gate 1700a and three line buffers 1700b–1700d. When the NRELACK is not asserted, the line buffer 1715b drives the logical OR between the ARAMBUS[0] and the output of the AND gate 1719 inputted through the NOR gate 1700a to the A[0]. When the NRELACK is asserted, the line buffer 1700d drives bit 0 on the A[0] inputted through the line buffer 1700c to the ARAMBUS[0].

In FIG. 18, bidirectional one-bit line transceivers 1815–1800 drives data between the DRAMBUS and the D bus. The line transceivers 1815–1808 drive the lines of each end and are connected to the high-order 8 bits of the DRAMBUS [15:8], the low-order 8 bits of the DRAMBUS[7:0], and the high-order 8 bits of the D[15:8]. The other line transceivers 1807–1800 drive the lines at each end and are connected to the low-order 8 bits of the DRAMBUS[7:0] and the low-order 8 bits of the D[7:0]. Therefore, D[15:8] can be connected to either the DRAMBUS[15:8] or the DRAMBUS[7:0].

The line transceiver 1815 is composed of gates 1815a–1815e. The AND-NOR gate 1815a selects either the DRAMBUS[15] or the DRAMBUS[7]. The line buffer 1815b outputs the selected bit to D[15] when either the NEXTWE or the NDMARE is asserted.

The line buffer 1815d outputs one bit of D[15] inputted through the buffer 1815c to the DRAMBUS[15] when either the NEXTRE or the NDMAWE is asserted. The line buffer 1815e outputs one bit of D[15] inputted through the buffer 1815c to the DRAMBUS[7] when either the NEXTRE or the NDMAWE is asserted and at the same time when either the ARAMBUS[0] is "1" or the BUS8BIT is asserted.

Gates 1816–1818 and 1820–1822 and a latch 1819 cooperates to control the selection of AND-NOR gates 1815a–1808a: The NOR gate 1821 and the NOT gate 1822 make the AND-NOR gates 1815a–1808a select the low-order byte (DRAMBUS[15:8]) when the BUSST[0]is a 1, the NDMAWD is a 0, and the output Q of the latch 1819 is a 0 and select the high-order byte (DRAMBUS[15:8]) when either the BUSST[0]is a 0, the NDMAWD is a 1, or the output Q of the latch 1819 is a 1.

The output Q of the latch 1819 corresponds to the results of the NOR gate 1818, synchronized with the clock signal CK1. The NOR gate 1821 detects that an instruction fetch performed by the PC unit 102 to an external circuit is 8 bits in length or that an operand data load/store performed by the data path unit 103 to an external circuit is 8 bits in length.

Gates 1823 and 1824 cooperates to control the output of the line buffers 1815b–1800b: when the NAND gate 1823 detects that either the NEXTWE or the NDMARE is asserted, the NOT gate 1824 asserts output-enable signals for the line buffers 1815b–1800b.

Gates 1825–1829 cooperate to control the outputs of the line buffers 1815d–1800d and 1815e–1808e.

The AND gate 1825 asserts output-enable signals for the line buffers 1815d–1800d when either the NEXTWE or the NDMAWE is asserted.

The OR gate 1827 asserts output-enable signals for the line buffers 1815e–1808e when either the NEXTWE or the NDMAWE is asserted and at the same time when either the ARAMBUS[0] is a 1 or the BUS8BIT is asserted.

The OR gate 1829 asserts output-enable signals for the line buffers 1807d–1800d when either the NEXTWE or the NDMAWE is asserted and at the same time when either the ARAMBUS[0] is a 0 or the BUS8BIT is not asserted.

The following is a description of the operation of the data processing apparatus constructed as above, with an example of a basic bus access.

Figure 20:
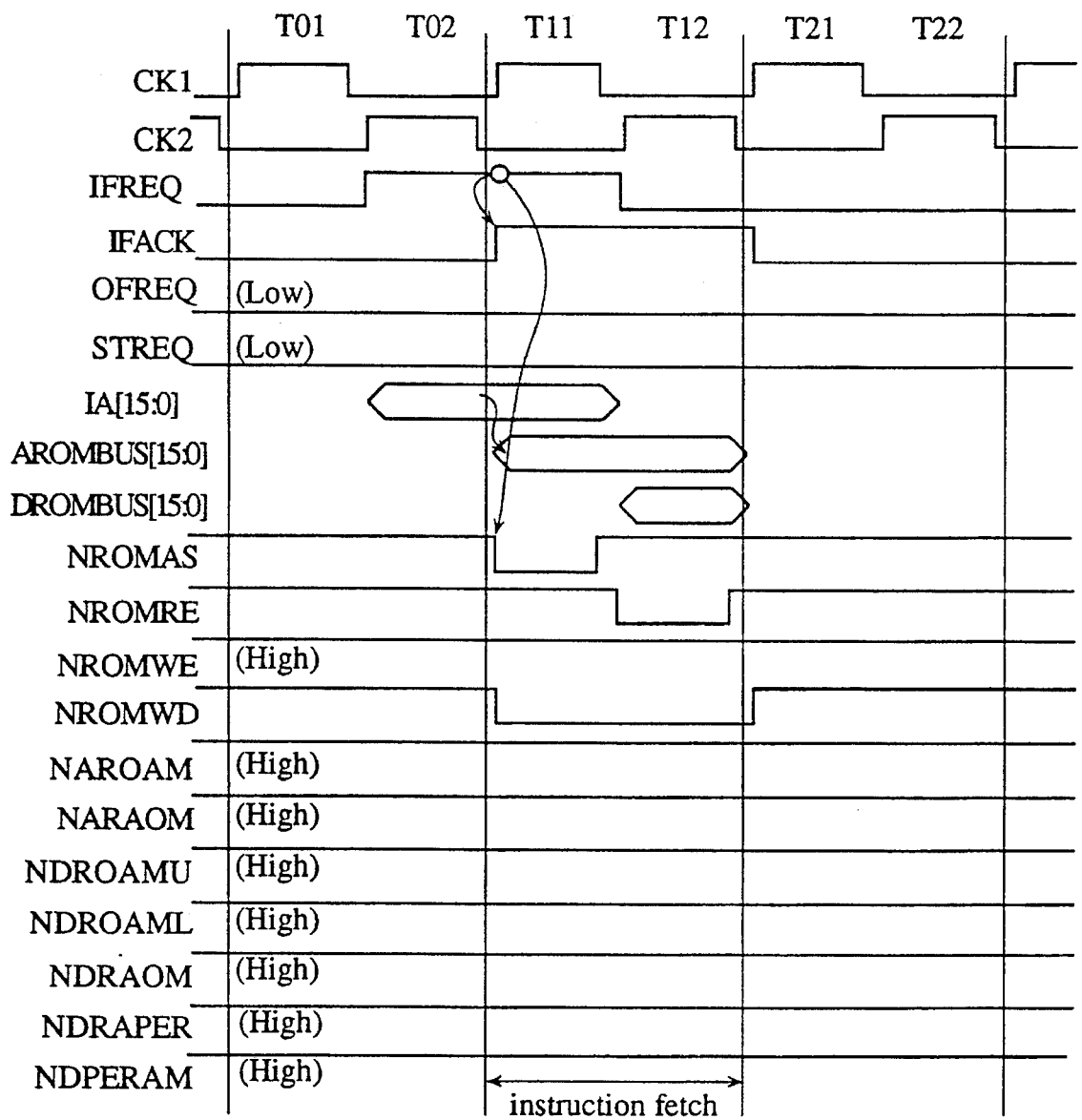
FIG. 20 is a time chart depicting the timing of an instruction fetch according to the embodiment.

(1) The operations of the decoder unit 101 and the PC unit 102 to fetch instructions from the internal ROM 104 is described as follows with reference to the timing chart of FIG. 20.

The PC unit 102 calculates the address of the next instruction (IA[15:0]) or a branch address, and outputs the IA in the timing of T02 concurrently with the instruction fetch request signal (IFREQ).

At this moment, the address space discrimination circuit 201 decodes the high-order 4 bits of the IA[15:11], identifies as an instruction fetch to the internal ROM 104, and asserts the ROM instruction access signals (IROM2) and (IROM1) in the timing of T02 and T11 respectively.

Responding to the assertion of IFREQ only, the bus arbiter 202 asserts an instruction fetch start signal (IFSTRT) and an instruction fetch acknowledgement signal (IFACK) in the timing of T02 and T11 respectively.

Responding to the assertion of the IFSTRT, the bus state transition circuit 203 transforms a bus state signal from an idle state (BUSST[3:0]=0000) where no access is performed into the state that an instruction only is being transferred (BUSST[3:0]=0100) in the timing of T11.

Responding to the transformation, a bus cycle is started and the IA is held by the instruction address buffer 112 and then outputted to the AROMBUS.

The bus control signal generation circuit 204 asserts an address strobe signal (NROMAS) indicating an address output and an access size signal (NROMWD) indicating word (16 bits) access in the timing of T11, and asserts a read enable signal (NROMRE) indicating read cycle in the timing of T12.

At the same time, the bus switch control signal generation circuit 205 detects access to the internal ROM 104 according to the bus state signal (BUSST[3:0]) and the IROM1. Then the circuit 205 controls the first bus switch 117 to set the AROMBUS and the DROMBUS unconnected and to set the ARAMBUS and the DRAMBUS unconnected by negating all the bus switch control signals (NAROAM, NARAOM, NDROAMU, NDROAML, NDRAOM) in the timing of T11.

The internal ROM 104 outputs an instruction corresponding to the address inputted thereto in the timing of T12, based on a ROM control signal. The instruction thus read is latched from the DROMBUS to the instruction fetch buffer 111 in the timing that the read enable signal (NROMRE) is negated, and is decoded in the instruction decoder 101.

Figure 21:
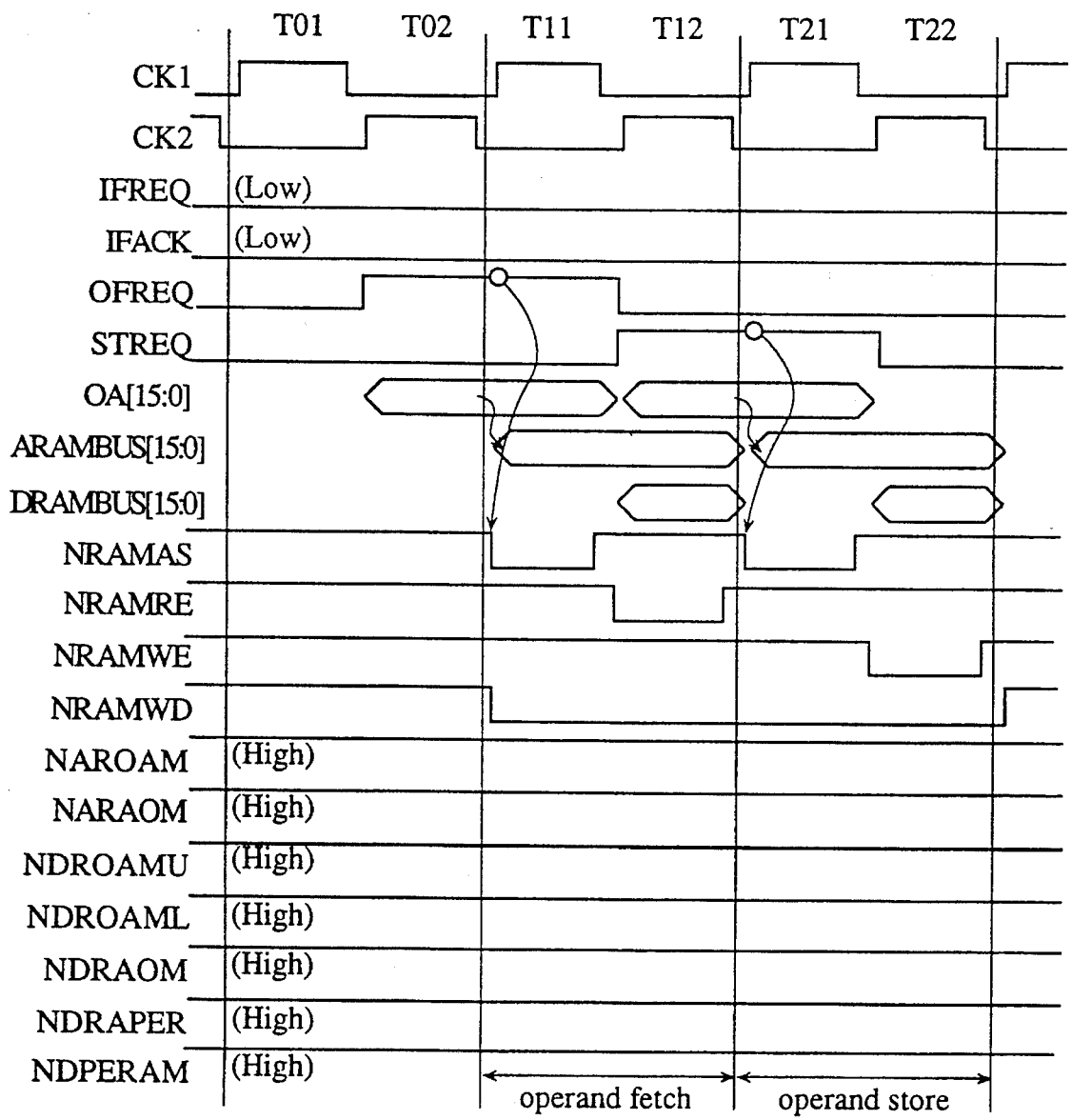
FIG. 21 is a time chart depicting the timing of data load or store according to the embodiment.

(2) The operation of the data path unit 103 to load and store data from the internal RAM 105 is described as follows with reference to the timing chart of FIG. 21.

The data path unit 103 calculates the operand address (OA[15:0]) of data to be loaded and outputs the OA in the timing of T02 concurrently with the load request signal (OFREQ).

At this moment, the address space discrimination circuit 201 decodes the high-order 4 bits of the OA[15:11], identifies as a data read from the internal RAM 104, and asserts a RAM data access signal (DRAM1) in the timing of T11.

Responding to the assertion of OFREQ only, the bus arbiter 202 asserts a load start signal (OFSTRT) in the timing of T02.

Responding to the assertion of the OFSTRT, the bus state transition circuit 203 transforms a bus state signal from an idle state (BUSST[3:0]=0000) to the state that only an operand is transferred (BUSST[3:0]=0100) in the timing of T11.

Responding to the transformation, a bus cycle is started and the OA is held by the operand address buffer 113 and outputted to the ARAMBUS.

The bus control signal generation circuit 204 asserts an address strobe signal (NRAMAS) indicating an address output and an access size signal (NRAMWD) indicating word (16 bits) access in the timing of T11, and asserts a read enable signal (NRAMRE) indicating a read cycle in the timing of T12.

At the same time, the bus switch control signal generation circuit 205 detects access to the internal RAM according to the bus state signal and RAM data access signals. The circuit 205 then controls the first and second bus switches 117 and 118 to set the AROMBUS unconnected with the ARAMBUS, the DROMBUS unconnected with the DRAMBUS, the ARAMBUS unconnected with the APERIBUS, and the DRAMBUS unconnected with the DPERIBUS by negating all the bus switch control signals (NAROAM, NARAOM, NDROAMU, NDROAML, NDRAOM, NDRAPER, NDPERAM) in the timing of T11.

The internal RAM 105 outputs data corresponding to the address to the DRAMBUS in the timing of T12, based on the RAM control signals. The data thus read is latched from the DRAMBUS to the load buffer 114 in the timing that the NRAMRE is negated, and is outputted to the data path unit 103.

To store data to the internal RAM 105, the data path unit 103 lets the store buffer 115 hold the data in the timing of T12 that the address is held in the operand address buffer 113 in the above-mentioned data load operation. Then, the bus control signal generation circuit 204 asserts an address strobe signal (NRAMAS) in the timing of T21 and an access size signal (NRAMWD) in the timing of T21, and asserts a write enable signal (NRAMWE) in the timing of T22. Then the circuit 204 controls the operand address buffer 113 to output the OA to the ARAMBUS in the timing of T21 and the store buffer 115 to output the data to the DRAMBUS in the timing of T22. The data on the DRAMBUS is written into the internal RAM 105 in the timing that NRAMWE is negated.

Figure 22:
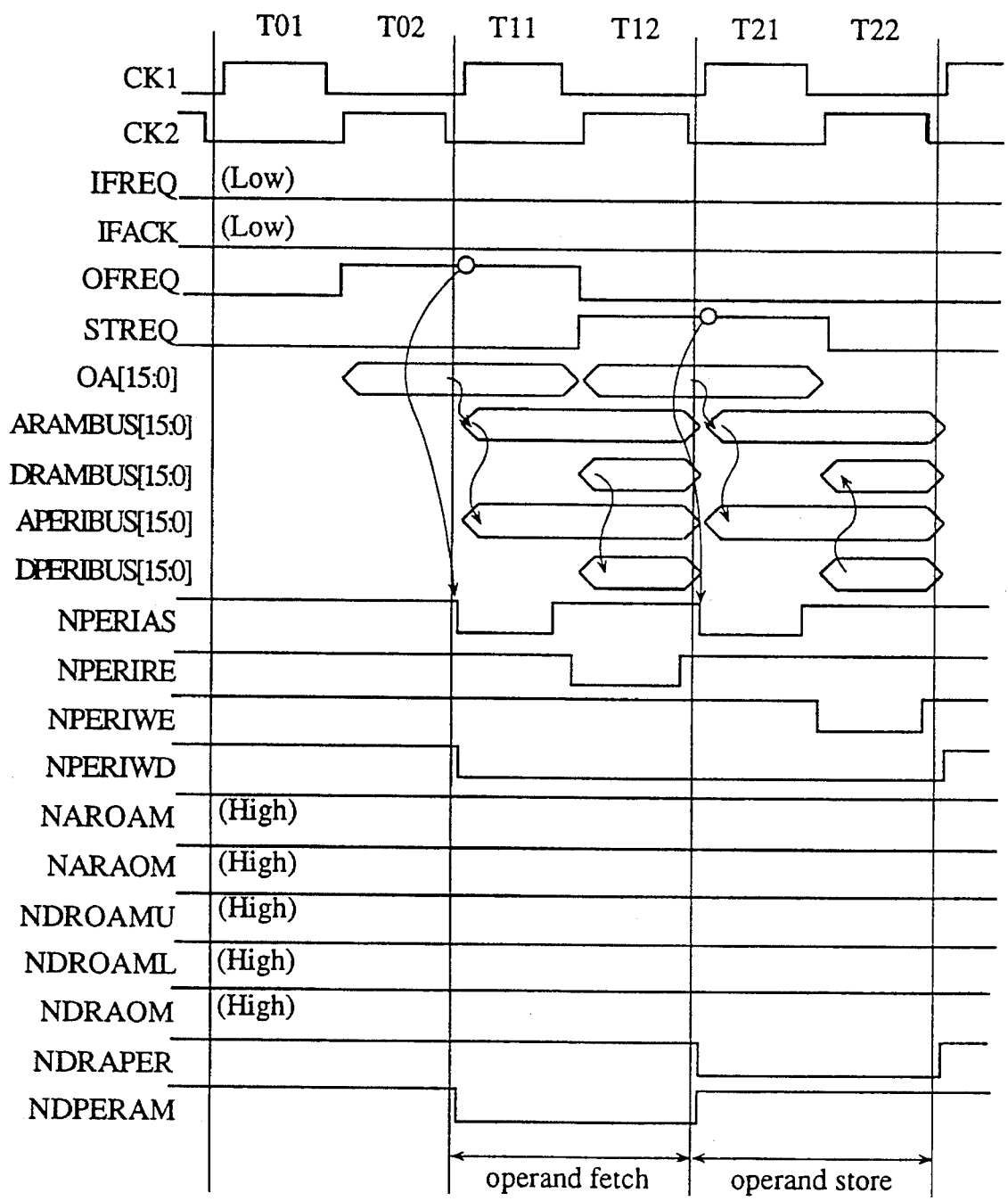
FIG. 22 is a time chart depicting the timing the internal peripherals load or store according to the embodiment.

(3) The operation of the data path unit 103 to load and store data from the internal peripherals 106 is described as follows with reference to the timing chart of FIG. 22.

The operation is equal to the access to the internal RAM 105 described in (2) except for the way that the bus switch control unit 120 controls the bus switches 117 and 118.

The bus control signal generation circuit 204 asserts an address strobe signal (NPERIAS) and an access size signal (NPERIWD) in the timing of T11, and asserts a read enable signal (NRERIRE) in the timing of T12.

At the same time, the bus switch control signal generation circuit 205 detects access to the internal peripherals 106 according to the bus state signals and the peripheral data access signals. The circuit 205 controls the first bus switch 117 to set the AROMBUS and the ARAMBUS unconnected respectively with the DROMBUS and the DRAMBUS by negating the bus switch control signals (NAROAM, NARAOM, NDROAMU, NDROAML, NDRAOM) in the timing of T11 and also controls the second bus switch 118 to set the ARAMBUS and the DRAMBUS connected respectively with the APERIBUS and the DPERIBUS by asserting the bus switch control signals (NDRAPER,

NDPERAM).

As a result, the address outputted from the operand address buffer 113 is supplied to the internal peripherals 106 through the ARAMBUS and the APERIBUS.

The internal peripherals 106 outputs data corresponding to the address to the DPERIBUS in the timing of T12, based on the peripheral control signals. The data thus outputted is held by the load buffer 114 through the DRAMBUS in the timing that the NPERIRE is negated, and is outputted to the data path unit 103.

To store data to the internal peripherals 106, the data path unit 103 lets the store buffer 115 hold the data in the timing of T12 in which the address is held in the operand address buffer 113 in the above-mentioned data load. Then, the bus control signal generation circuit 204 asserts an address strobe signal (NPERIAS) and an access size signal (NPERIWD) in the timing of T11, and asserts a write enable signal (NPERIWE) in the timing of T12. Then the circuit 204 controls the operand address buffer 113 to output the OA to the APERIBUS in the timing of T21 and the store buffer 115 to output the data to the DPERIBUS in the timing of T22. The data on the DPERIBUS is written into the internal peripherals 106 in the timing that the NPERIWE is negated.

Figure 23:
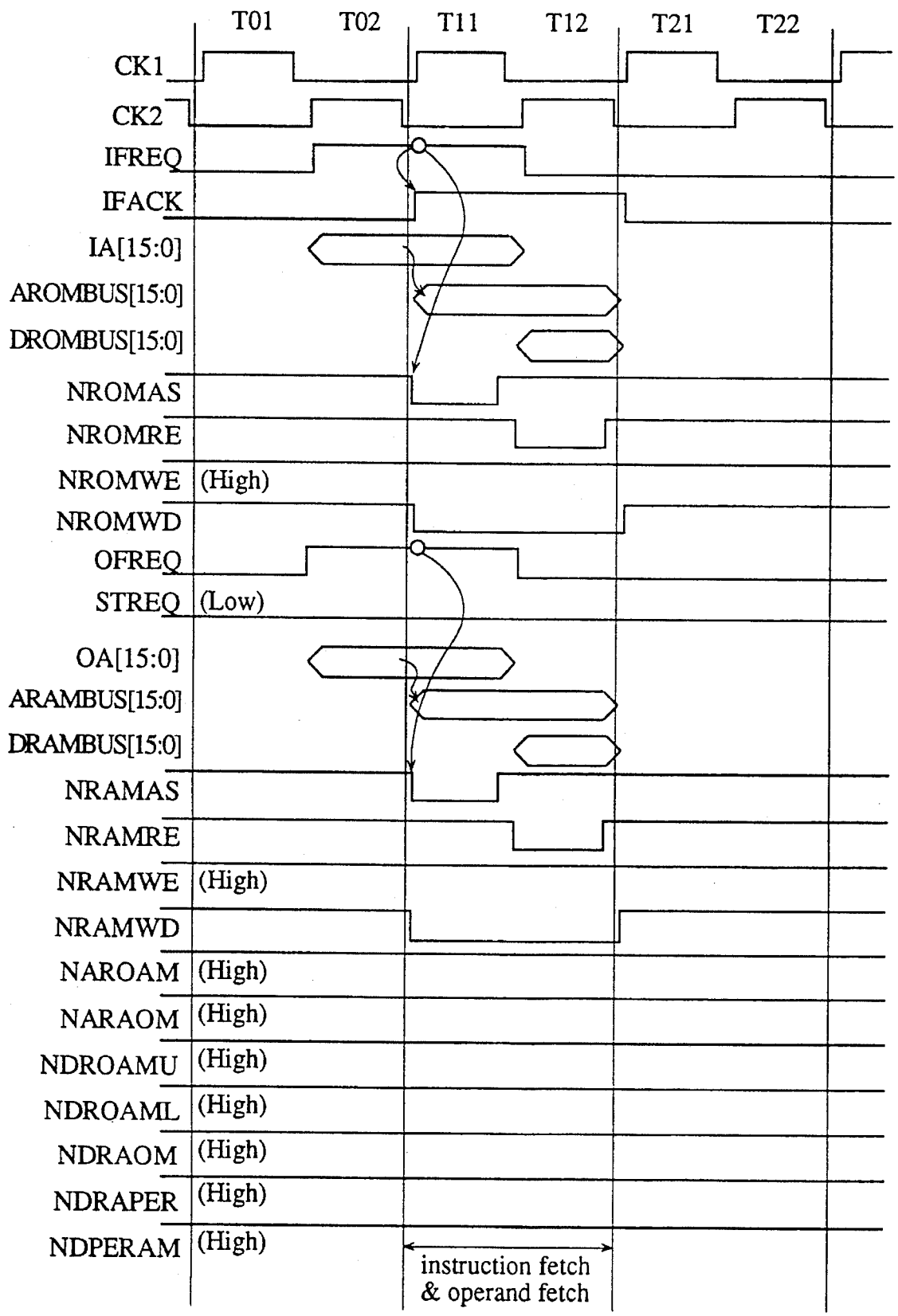
FIG. 23 is a time chart depicting the timing in which an instruction fetch from the internal ROM and load from the internal RAM are performed at the same time according to a first embodiment of this invention.

(4) The operations of the instruction decoder 101 and the PC unit 102 to fetch instructions to the internal ROM 104 and at the same time the operations of the data path unit 103 to load data to the internal RAM 105 is described as follows with reference to the timing chart of FIG. 23.

The PC unit 102 outputs an IA[15:0] in the timing of T02 concurrently with the IFREQ. The data path unit 103 outputs the OA[15:0] in the timing of T02 concurrently with an OFREQ.

At this moment, the address space discrimination circuit 201 decodes the IA[15:11] and the OA[15:11], and detects instruction fetch from the internal ROM and data load from the internal RAM. The circuit 201 asserts a ROM instruction access signal (IROM2) in the timing of T02 and a ROM instruction access signal (IROM1) and a RAM data access signal (DRAM1) in the timing of T11.

Although both IFREQ and OFREQ are asserted, the bus arbiter 202 detects that the instruction fetch and the data load do not conflict on the bus because the address space identification signals are IROM1, IROM2, DRAM1. Then, the bus arbiter 202 asserts the IFSTRT and the OFSTRT at the same time and asserts an instruction fetch request acknowledgment signal (IFACK) in the timing of T11.

Responding to the assertion of the IFSTRT and OFSTRT, the bus state transition circuit 203 transforms the bus state signal from the idle state (BUSST[3:0]=0000) to the state that an instruction and an operand are transferred at the same time (BUSST[3:0]=0110) in the timing of T11. Then the IA is held in the instruction address buffer 112 and outputted to the AROMBUS, while the OA is held in the operand address buffer 113 and outputted to the ARAMBUS.

The bus control signal generation circuit 204 asserts address strobe signals (NROMAS and NRAMAS) and access size signals (NROMWD and NRAMWD) in the timing of T11, and asserts read enable signals (NROMRE and NRAMRE) in the timing of T12.

At the same time, the bus switch control signal generation circuit 205 detects instruction fetch from the internal ROM and data load from the internal RAM. The circuit 205 controls the first and second bus switches 117 and 118 to set the AROMBUS and the DROMBUS unconnected respectively with the ARAMBUS and the DRAMBUS and to set the ARAMBUS and the DRAMBUS unconnected respectively with the APERIBUS and the DPERIBUS by negating all the bus switch control signals (NAROAM, NARAOM, NDROAMU, NDROAML, NDRAOM, NDRAPER, and NDPERAM) in the timing of T11.

The internal ROM 104 is read an instruction corresponding to the address, based on the ROM control signals, and the instruction is outputted to the DROMBUS in the timing of T12. The outputted instruction is latched by the instruction fetch buffer 111 in the timing that the NROMRE is negated, and outputted to the instruction decoder 101.

At the same time, the internal RAM 105 is read data corresponding to the address, based on the RAM control signals and the data is outputted to the DRAMBUS in the timing of T12. The outputted data is latched by the load buffer 114 in the timing that the NRAMRE is negated, and outputted to the data path unit 103.

Figure 24:
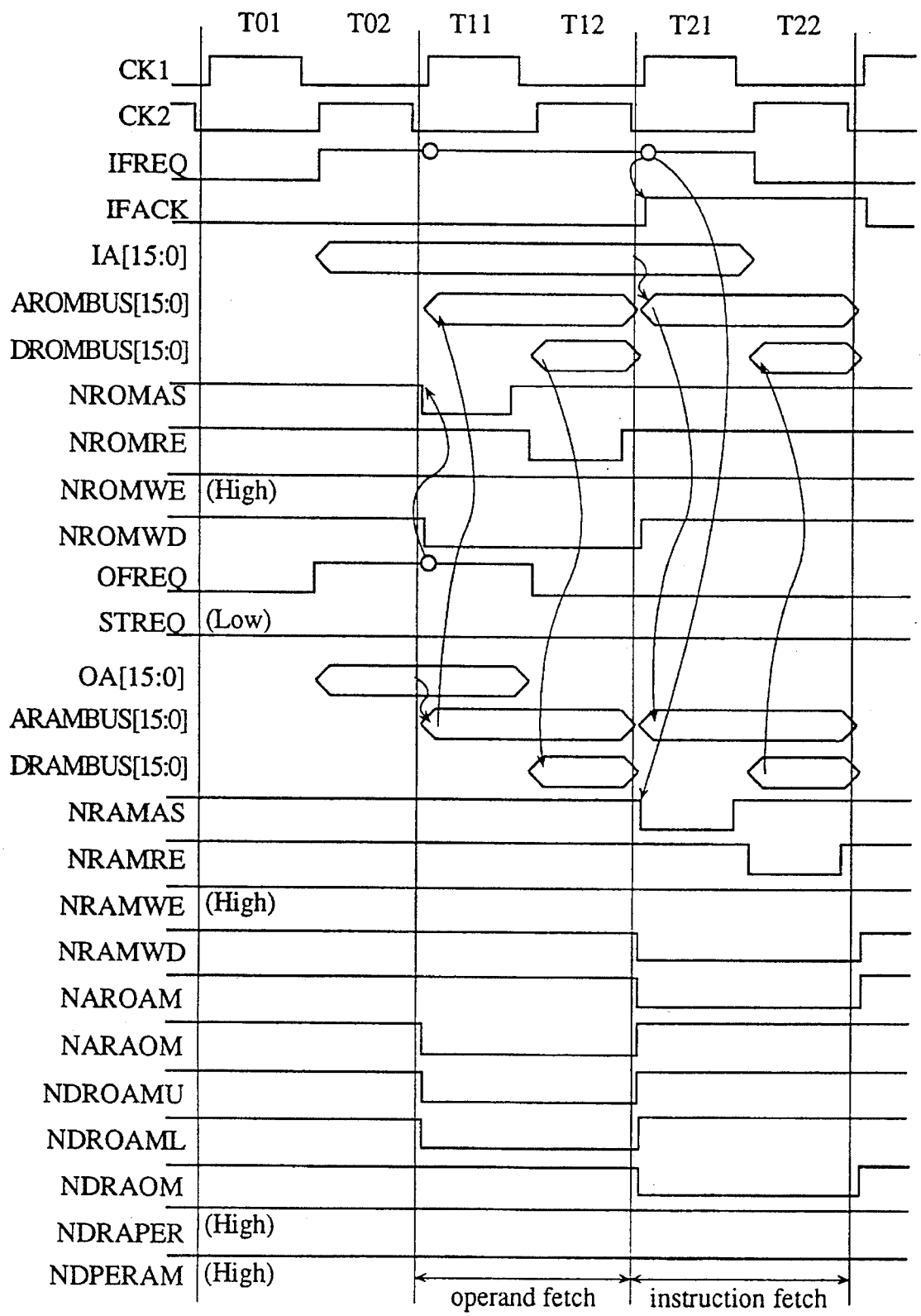
FIG. 24 is a time chart depicting the timing in which an instruction fetch from the internal RAM and load from the internal ROM are performed at the same time according to a first embodiment of this invention.

(5) Finally, the operation of the data path unit 103 to load data to the internal ROM 104 and at the same time the operation of the instruction decoder 101 and the PC unit 102 to fetch instructions to the internal RAM 105 is described as follows with reference to the timing chart of FIG. 24.

The PC unit 102 outputs an IA[15:0] in the timing of T02 concurrently with the IFREQ. The data path unit 103 outputs the OA[15:0] in the timing of T02 concurrently with an OFREQ.

At this moment, the address space discrimination circuit 201 decodes the IA[15:11] and the OA[15:11], and detects instruction fetch from the internal RAM and data load from the internal ROM. The circuit 201 asserts a RAM instruction access signal (IRAM1) and a ROM data access signal (DROM1) in the timing of T11.

Although both IFREQ and OFREQ are asserted, the bus arbiter 202 detects the instruction fetch and the data load conflict on the bus, because the address space identification signals are IRMA1 and DROM1. Then the bus arbiter 202 asserts the OFSTRT in the timing of T02 and does not assert the IFSTRT.

Responding to the assertion of the OFSTRT, the bus state transition circuit 203 transforms the bus state signal from the idle state (BUSST[3:0]=0000) to the state that an operand is transferred (BUSST[3:0]=0010) in the timing of T11. Then the OA is held by the operand address buffer 113 and outputted to the ARAMBUS, while the IA is held in the instruction address buffer 112 but not outputted to the AROMBUS.

The bus control signal generation circuit 204 asserts an address strobe signal (NROMAS) and an access size signal (NROMWD) in the timing of T11, and asserts a read enable signal (NROMRE) in the timing of T12.

At the same time, the bus switch control signal generation circuit 205 detects data load from the internal ROM according to the bus states and the address space identification signals.

The circuit 205 controls the first bus switch 117 to set the ARAMBUS and the DROMBUS connected respectively with the AROMBUS and the DRAMBUS by asserting bus switch control signals (NARAOM, NDROAMU UDROAML) and negating the bus switch control signals (NAROAM, NDRAOM) in the timing of T11 so that data can be transferred from the ARAMBUS to the AROMBUS and from the DROMBUS to the DRAMBUS.

The outputted data is held in the load buffer 114 through the DRAMBUS in the timing that the read enable signal is negated, and is further outputted to the data path unit 103.

In the next bus cycle, responding to the IFREQ, the bus arbiter 202 asserts an instruction fetch start signal (IFSTRT) and an instruction fetch acknowledgement signal (IFACK)

in the timing of T12 and T21 respectively.

Responding to the assertion of the IFSTRT, the bus state transition circuit 203 transforms the bus state signal from the state that an operand only is transferred (BUSST[3:0]=0010) in the timing of T21 to the state that an instruction only is transferred (BUSST[3:0]=0100). Then the IA held in the instruction address buffer 112 is outputted to the AROMBUS.

The bus control signal generation circuit 204 asserts an address strobe signal (NRAMAS) and an access size signal (NRAMWD) in the timing of T21, and asserts a read enable signal (NRAMRE) in the timing of T22.

At the same time, the bus switch control signal generation circuit 205 detects instruction fetch from the internal RAM according to the bus state signal and the address space identification signal. The circuit 205 controls the first bus switch 117 to set the AROMBUS connected with the ARAMBUS and to set the DRAMBUS connected with the DROMBUS by asserting the bus switch control signals (NAROAM, NDRAOM) in the timing of T21 and negating the bus switch control signals (NARAOM, NDROAMU, NDROAML) so that data can be transferred from the AROMBUS to the ARAMBUS and from the DRAMBUS to the DROMBUS.

The internal RAM 105 is read data corresponding to the address, based on the RAM control signals and the data is outputted to the DRAMBUS in the timing of T22. The outputted data is latched by the instruction fetch buffer 111 in the timing that the NRAMRE is negated, and outputted to the instruction decoder 101.

As described hereinbefore, the bus control unit 120 separates the internal buses by controlling the bus switches, so that an instruction and data can be accessed concurrently. Furthermore, the buses can be interconnected upon request to transfer table data stored in the internal ROM 104 to the data path unit 103. The disconnection of the buses has the advantage of reducing load to each bus, thereby heightening clock frequency.

Embodiment 2

The construction of the data processing apparatus of this embodiment is the same as that of Embodiment 1 except for the following aspect.

Unlike in Embodiment 1, a mode signal (BUS8BIT) inputted to the bus control unit 120 is asserted. The BUS8BIT is a mode which indicates to be effective only to the high-order 8 bits (D[15:8]) of an external data bus (D[15:0]), for example when an 8-bit width external memory is connected to the high-order 8 bits (D[15:8]) of the external data bus. In this case, the low-order 8 bits are ineffective, making the effective length of the external data bus being shorter than the internal data bus (DROMBUS [15:0], DRAMBUS[15:0], DPERIBUS[15:0]).

Figure 25:
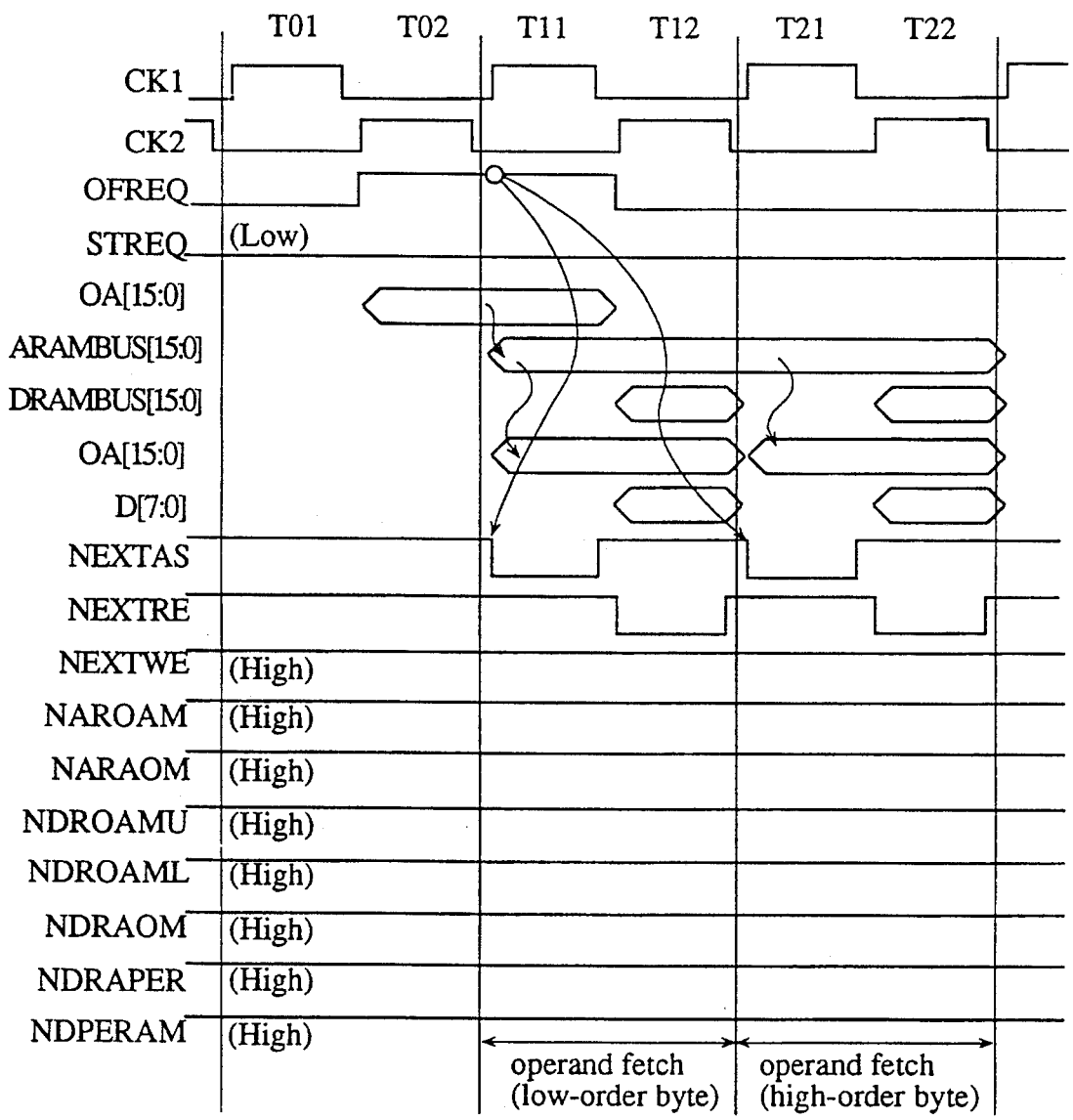
FIG. 25 is a time chart depicting the timing when an 8-bit external bus is connected to the external bus I/F unit according to a second embodiment of this invention.

The following is a description of the operation of the data processing apparatus constructed as above, in the case that the data path unit 103 loads data from the external memory connected to the external data bus (D[15:8]) with reference to the timing chart shown in FIG. 25.

The data path unit 103 calculates the operand address (OA[15:0]) of data to be loaded and outputs the OA[15:0] in the timing of T02 concurrently with the load request signal (OFREQ). The LSB(OA[O]) of OA[15:0] is a 0. This OA is a byte address.

The address space discrimination circuit 201 decodes OA[15:0] and detects data load from the external memory. The circuit 201 asserts an external data access signal (DEXT2) in the timing of T02 and an external data access signal (DEXT1) in the timing of T11.

Responding to the assertion of OFREQ only, the bus arbiter 202 asserts OFSTRT at the timing of T02.

Responding to the assertion of the OFSTRT and BUSST [3:0], the bus state transition circuit 203 transforms the bus state signal, in the timing of T11, from the idle state to the state that an operand only (BUSST[3:0]=0011) is transferred. As a result, a bus cycle is restarted and the OA is held in the operand address buffer 113 and is outputted to the ARAMBUS.

The bus control signal generation circuit 204 asserts an address strobe signal (NEXTAS) in the timing of T11, and asserts a read enable signal (NEXTRE) in the timing of T12.

At the same time, the bus switch control signal generation circuit 205 detects access to the external memory according to the bus state signal and the address space identification signal. The circuit 205 controls the first and second bus switches 117 and 118 to set the AROMBUS and the DROMBUS unconnected respectively with the ARAMBUS and the DRAMBUS and to set the ARAMBUS and the DRAMBUS unconnected respectively with the APERIBUS and the DPERIBUS by negating all the bus switch control signals.

The external memory outputs data corresponding to the address to the external data bus (D[15:8]), based on the external bus control signals. Since the bus state signal indicates the transfer of a first byte, the external bus I/F unit 116 outputs data on the high-order 8 bits (D[15:8]) to the low-order 8 bits DRAMBUS[7:0]) of the DRAMBUS and lets the load buffer 114 hold the data in the low-order 8 bits.

Then, the circuit 203 transforms the state that an operand only is transferred and the first byte is being transferred (BUSST[3:0]=0011) into the state that an operand only is transferred and the second byte is transferred (BUSST[3:0] =0010). The operations of the bus control signal generation circuit 204 and the bus switch control signal generation circuit 205 do not depend on the LSB (BUSST[O]) of the bus state, so that the bus control signals and the bus switch control signals are outputted in the same manner as the first byte transfer.

Responding to the transformation from BUSST[3:0]= 0011 to BUSST[3:0]=0010, the external bus I/F unit 116 makes the LSB(A[0]) of the external address bus be a 1. This means the address of the first byte is incremented by 1 and the address of the second byte is outputted from the external bus I/F unit 116.

The external memory outputs data corresponding to the address to the external data bus (D[15:8]) in the timing of T22, based on the external bus control signals. Since the bus state signal indicates the transfer of a second byte, the external bus I/F unit 116 outputs data on the high-order 8 bits (D[15:8]) to the high-order 8 bits (DRAMBUS[15:8]) of the DRAMBUS and lets the load buffer 114 hold the data on the high-order 8 bits in the timing that the read enable signal is negated. Thus, 16-bit data is ready, so that the data path unit 103 takes out data from the load buffer 114.

As described hereinbefore, when BUS8BIT telling that the bus length of the external data bus being shorter than that of the internal data bus is inputted, the bus control unit 120 controls the bus to be accessed several times, thereby the length can be reduced. This can reduce the bus length to the memory connected to the outside of the chip, decreasing the cost for a board mounting this chip.

Embodiment 3

The construction of the data processing apparatus of this embodiment is the same as that of Embodiment 1 except for the following aspect.

Unlike in Embodiment 1, a signal Data Fetch Upper (DFU) and/or a signal Data Fetch Lower (DFL) inputted from the decoder 101 to the bus control unit 120 is asserted.

The DFU and DFL control connecting/disconnecting operations between the DROMBUS[15:0] and the DRAMBUS[15:0] by the first bus switch 117. When the DFU is asserted, the high-order 8 bits (DROMBUS[15:8] and DRAMBUS[15:8]) are connected and when the DFL is asserted, the low-order 8 bits (DROMBUS[7:0] and DRAMBUS[7:0]) are connected.

Figure 26:
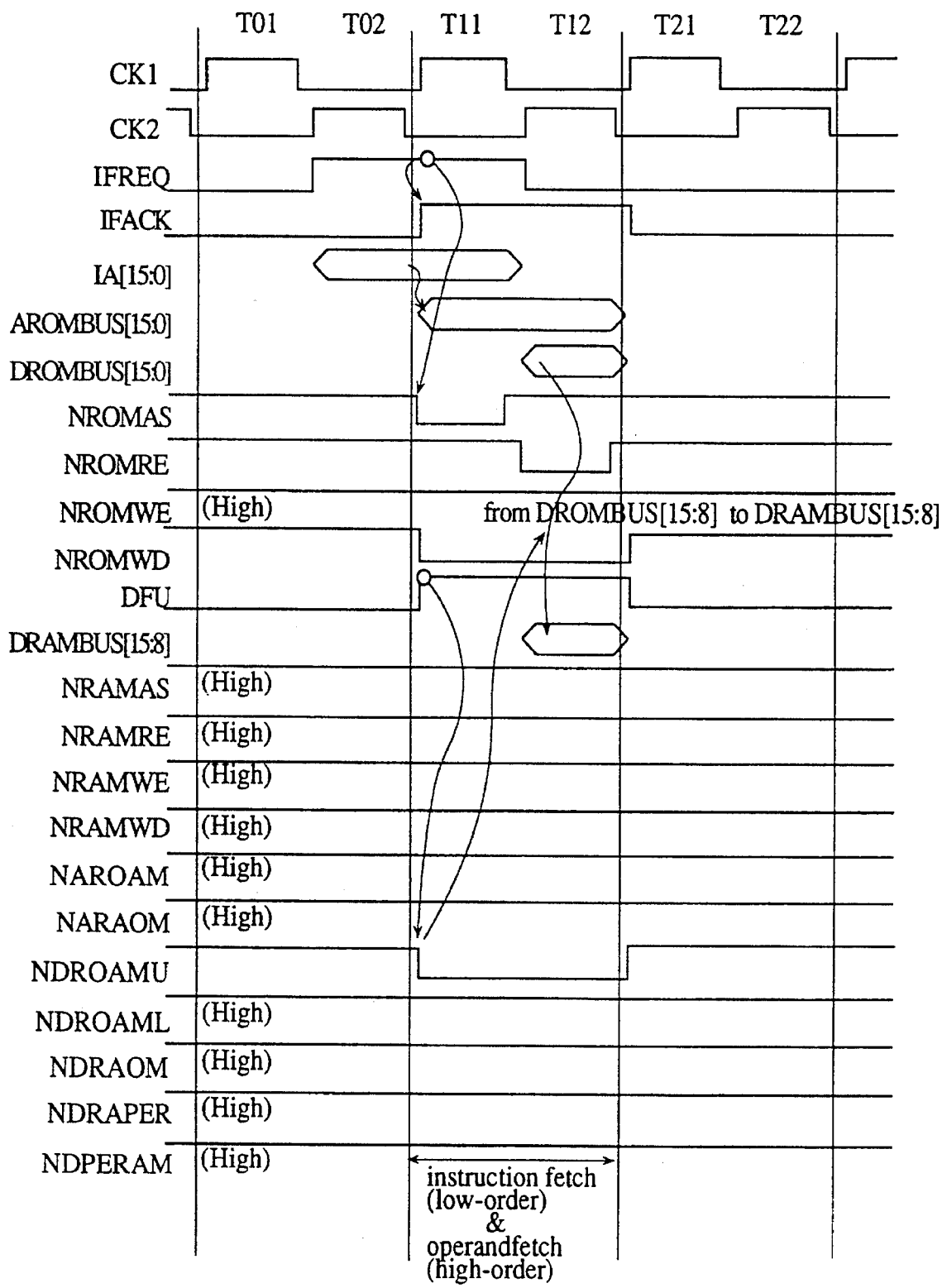
FIG. 26 is a time chart depicting the timing of data access when the external bus I/F unit is controlled in units of one byte according to a third embodiment of this invention.

The following is a description of the operation of the data processing apparatus constructed as above, in the case that the data path unit 103 loads data from the ROM 104 concurrently with instruction fetch of the PC unit 102, with reference to the timing chart shown in FIG. 26.

Concurrent fetch of an instruction and an operand is performed as follows:

For example, if the first and second bytes of a 3-byte instruction code whose third byte carries an 8-bit immediate data is fetched in a cycle, then in the next cycle the third byte (immediate data) is fetched together with the first byte of another instruction. This immediate data should be directly inputted to the data path unit 103 rather than to the decoder unit 101. Therefore, the decoder unit 101 finds the third byte carries the immediate data by decoding the first and second bytes, and asserts the DFU.

The operations of the address space discrimination circuit 201, the bus arbiter 202, the bus state transition circuit 203, the bus control signal generation circuit 204 to fetch instructions from the PC unit 102 to the internal ROM 104 are the same as (1) in Embodiment 1 except for the following.

At the same time as the bus control signal generation circuit 204 outputs the ROM control signals (NROMAS, NROMRE, NROMWD), the bus switch control signal generation circuit 205 detects access to the internal ROM according to the bus state signal and the address space identification signal. The circuit 205 negates the bus switch control signals (NAROAM, NARAOM, NDROAML, NDRAOM) in the timing of T11. Unlike in Embodiment 1, the NDROAMU is asserted because the DFU is asserted. As a result, the AROMBUS[15:0] and the DROMBUS[7:0] are set unconnected with the ARAMBUS[15:0] and the DRAMBUS[7:0] respectively while the DROMBUS[15:8] and DRAMBUS[15:8] are connected. Therefore, 8-bit data can be transferred from the DROMBUS[15:8] to the DRAMBUS [15:8].

The internal ROM 104 outputs an instruction corresponding to the address to the DROMBUS[15:0] in the timing of T12, based on the ROM control signals. The 8 bits of the DROMBUS[7:0] is latched to the low-order 8 bits of the instruction fetch buffer 111 and is outputted to the decoder 101 in the timing that the read enable signal (NROMRE) is negated. At the same time, the 8 bits of the DROMBUS [15:8] is latched to the high-order 8 bits of the load buffer 114 through the DRAMBUS[15:8] and outputted to the data path unit 103.

As described hereinbefore, the bus switch control signal generation circuit 205 controls so that data in the internal ROM 104 is transferred to the data path unit 103 concurrently with instruction fetch of the PC unit 102, according to the DFU and DFL which indicate the byte-to-byte connection of DROMBUS[15:0] and DRAMBUS[15:0]. This can speed up operand data transfer.

Embodiment 4

The construction of the data processing apparatus of this embodiment is the same as that of Embodiment 1 except for the following aspect.

Unlike in Embodiment 1, a signal (NRELREQ) inputted from an external circuit to the bus control unit 120 is asserted. The NRELREQ indicates a request to release the internal buses (AROMBUS[15:0], DROMBUS[15:0], ARAMBUS[15:0], DRAMBUS[15:0], APERIBUS[15:0], DRPERIBUS[15:0]) so that the external circuit can access the hardware resources in the chip.

Figure 27:
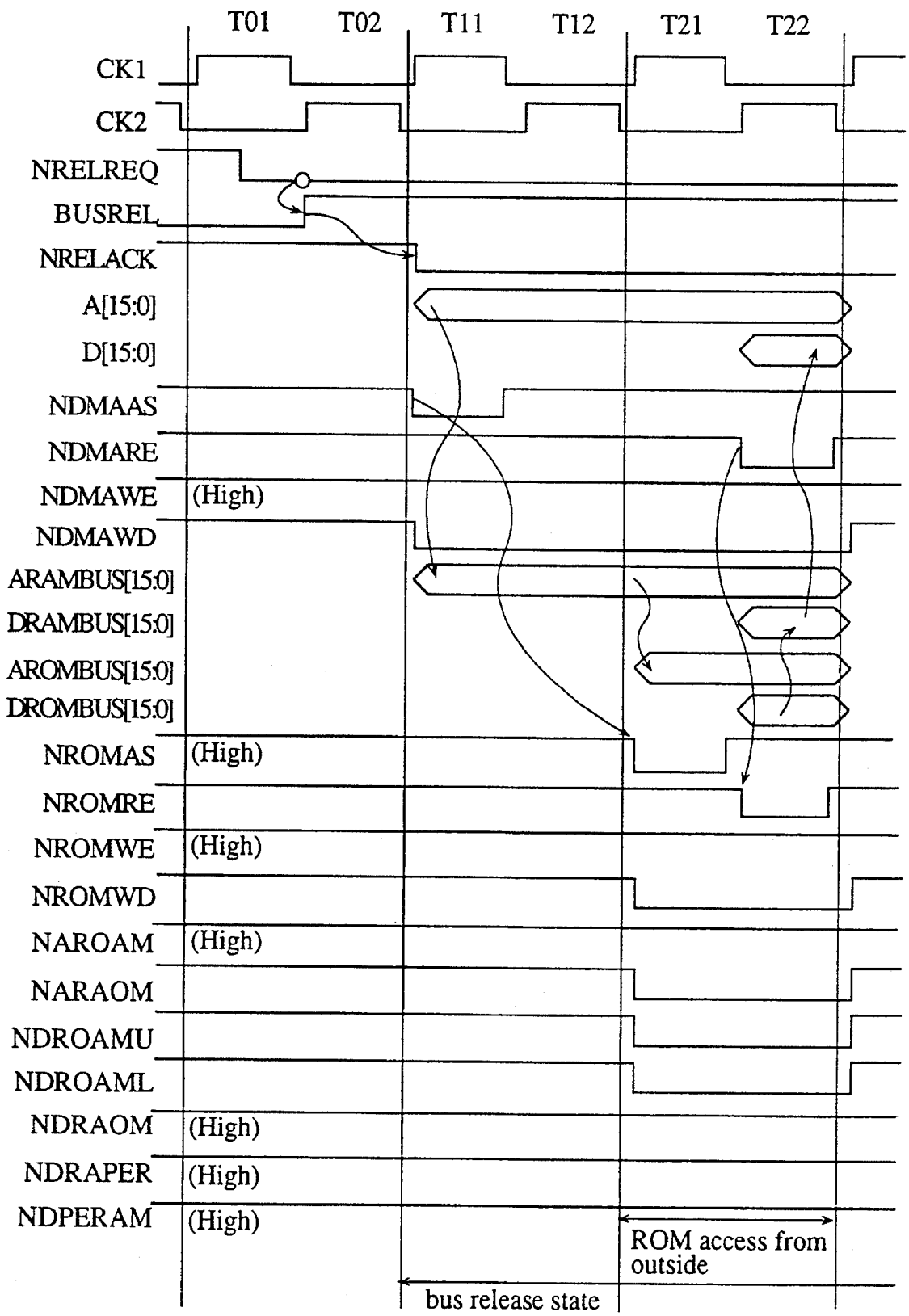
FIG. 27 is a time chart depicting the timing of data access from an external circuit when the internal buses are released according to the embodiment.

The following is a description of the operation of the data processing apparatus constructed as above, in the case that the external DMAC loads data from the internal ROM 104, with reference to the timing chart shown in FIG. 27.

The external DMAC asserts the NRELREQ in the timing of T01 so as to access the hardware resources in the chip.

Detecting assertion of the NRELREQ, the bus release request detection circuit 206 asserts a BUSREL indicating the bus is in the released state to the bus state transition circuit 203.

Responding to the assertion of the BUSREL, the bus state transition circuit 203 transforms the bus state signal from the idle state (BUSST[3:0]=0000) to the state that the bus is released (BUSST[3:0]=1000) in the timing of T11.

Responding to the transformation of the bus state, the bus release request detection circuit 206 asserts a bus release request acknowledgement signal (NREQACK) by which it is informed that the external DMAC is set to the bus released state.

Responding to the bus release, the external DMAC outputs data address to access to the external address bus (A[15:0]) in the timing of T11 in order to load data from the internal ROM 104. As the same time, the external DMAC asserts an address strobe signal (NDMAAS) and an access size signal (NDMAWD) in the timing of T11, and asserts a read enable signal (NDMAWD) in the timing of T22.

At this moment, the address space discrimination circuit 201 decodes the address inputted to the ARAMBUS[15:0] through the external bus I/F unit 116 from A[15:0] and detects data load to the internal ROM 104, and outputs ROM control signals. To be more precise, the circuit 201 asserts the NROMAS and NROMWD in the timing of T11, and asserts NROMRE in the timing of T22.

At the same time, the circuit 205 detects data load of the internal ROM 104 according to the bus state signal and the address space identification signal. The circuit 205 controls the first bus switch 117 to connect the ARAMBUS with the AROMBUS and the DROMBUS with the DRAMBUS by asserting the bus switch control signals (NARAOM, NDROAMU, NDROAML) and negating the bus switch control signals (NAROAM, NDRAOM) so that data can be transferred from the ARAMBUS to the AROMBUS and from the DROMBUS to the DRAMBUS.

The internal ROM 104 outputs an instruction corresponding to the address to the DROMBUS in the timing of T22, based on the ROM control signals. Then the external DMAC obtains data outputted to the external data bus (D[15:0]) through the DROMBUS, DRAMBUS and the external bus I/F unit 116 in the timing that the NDMARE is negated.

As described hereinbefore, the bus release request detection circuit 206 detects a bus release request; responding to the detected results, the bus control signal generation circuit 204 and the bus switch control signal generation circuit 205 controls bus release. This allows external circuits to access to the resources in the chip. As a result, compatibility with the external DMAC is improved and testing of the internal resources is simplified by adding a small amount of hardware.

Embodiment 5

The construction of the data processing apparatus of this embodiment is the same as that of Embodiment 1 except for the following aspect.

Unlike in Embodiment 1, a signal (NINHREQ) inputted from an external circuit to the bus control unit 120 is asserted. The NINHREQ indicates the request of the external circuit to inhibit the use of the internal peripherals 106.

Figure 28:
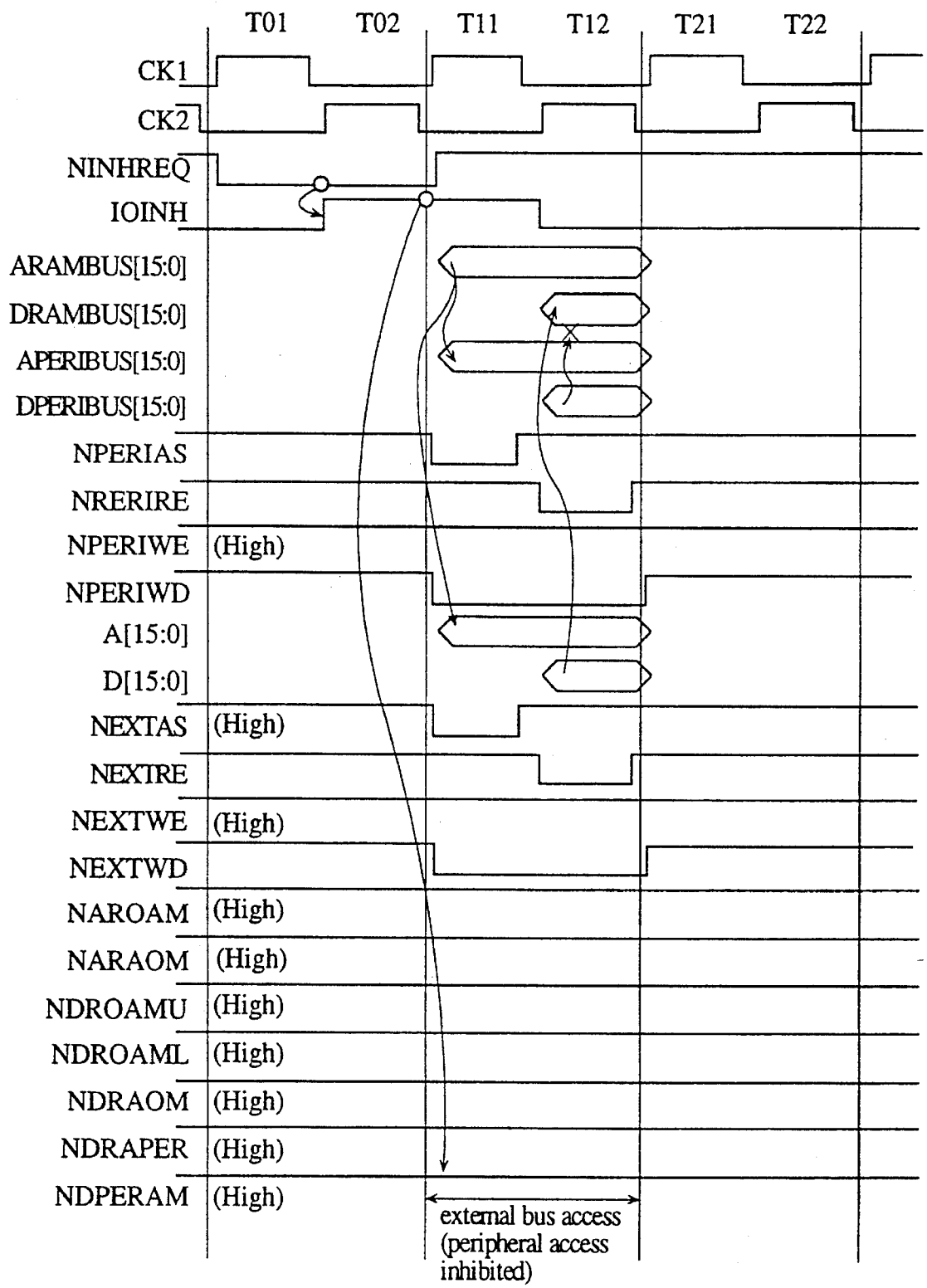
FIG. 28 is a time chart depicting the timing of data load from an external circuit in place of the internal peripherals according to the embodiment.

The following is a description of the operation of the data processing apparatus constructed as above, in the case that the data path unit 103 loads data to the external peripherals instead of the internal peripherals 106 with reference to the timing chart shown in FIG. 28. This is basically the same as (3) of Embodiment 1 except for the following aspects.

In order to load data from the external peripherals, the data path unit 103 outputs a signal requesting to inhibit the use of the internal peripherals 106 in the timing of T01. The peripheral access inhibition request detection circuit 207 detects assertion of the NINHREQ, and asserts a peripheral access inhibition signal (IOINH) to the bus control signal generation circuit 204 and the bus switch control signal generation circuit 205 in the timing of T02.

The bus control signal generation circuit 204 asserts an address strobe signal (NEXTAS) and an access size signal (NEXTWD) in the timing of T11 and asserts a read enable signal (NEXTRE) in the timing of T12.

At the same time, responding to the assertion of the IOINH, the bus switch control signal generation circuit 205 detects access to the external peripherals in place of the internal peripherals 106. The circuit 205 controls the second bus switch 118 to set the ARAMBUS and the A bus unconnected by negating one of the bus switch control signal (NDPERAM) which indicates data transfer from the DPERIBUS[15:0] to the DRAMBUS[15:0] in the timing of T11. As a result, the address outputted from the operand address buffer 113 is supplied to the external peripherals through the ARAMBUS[15:0] and the external address bus (A[15:0]).

The external peripherals output data corresponding to the address to the external data bus (D[15:0]) in the timing of T12, based on the external bus control signals. The address is held to the load buffer 114 through the DRAMBUS in the timing that the NEXTRE is negated. Then the address is outputted to the data path unit 103.

As described hereinbefore, providing a circuit to detect a mode indicating to inhibit the use of the internal peripheral circuit allows to use external peripherals or another chip in the bus released mode by integrating them with the data processing apparatus of this invention.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A data processing apparatus provided with an instruction storage unit, an instruction preparation unit, an instruction execution unit, and a data storage unit, said data processing apparatus comprising:

a first bus for carrying data and addresses between the instruction storage unit and the instruction preparation unit;

a second bus for carrying data and addresses between the instruction execution unit and the data storage unit;

first switch means for selectively connecting and disconnecting said first and second buses electrically; and control means for controlling said first switch means to connect the first and second buses when said instruction execution unit accesses said instruction storage unit and when said instruction preparation unit accesses said data storage unit, and said first switch means to disconnect the first and second buses when said instruction preparation unit accesses said instruction storage unit and when said instruction execution unit accesses said data storage unit.

2. The data processing apparatus of claim 1, wherein said first bus includes an m-bit first address bus and an n-bit first data bus (where m and n are integers greater than zero);

said second bus includes an m-bit second address bus and an n-bit second data bus; and said first switch means includes an m-bit first bus transceiver for bidirectionally connecting and disconnecting said first and second address buses, and further includes an n-bit second bus transceiver for bidirectionally connecting and disconnecting said first and second data buses.

3. The data processing apparatus of claim 2, wherein said control means comprises:

detecting means for detecting:

a first request indicating a request to access from the instruction execution unit to the instruction storage unit, a second request indicating a request to access from the instruction preparation unit to the data storage unit, a third request indicating a request to access from the instruction preparation unit to the instruction storage unit, and a fourth request indicating a request to access from the instruction execution unit to the data storage unit; and bus control means for controlling said first switch means to be connected when one of the first and second requests are detected, and for controlling said first switch means to be disconnected when the third and/or fourth requests are detected.

4. The data processing apparatus of claim 3, wherein said detecting means comprises:

a first decoding circuit for decoding an address inputted from the instruction preparation unit through said first address bus, the decoded address being regarded as the third request when the decoded address is for the instruction storage unit, and being regarded as the second request when the decoded address is for the data storage unit; and a second decoding circuit for decoding an address inputted from the instruction execution unit through said second address bus, the decoded address being regarded as the first request when the decoded address is for the instruction storage unit, and being regarded as the fourth request when the decoded address is for the data storage unit.

5. The data processing apparatus of claim 2, wherein said n-bit second bus transceiver is so constructed that lines composing each said data bus corresponding to r-bit ($1 \leq r \leq n-1$) can be connected and disconnected independently of the other lines corresponding to (n−r) bit, and wherein said control means comprises:

direction detecting means for, as a predetermined direction, detecting an input of a signal indicating that the (n−r) bit of the n-bit instruction to be read out next corresponds to data, and first switch control means for controlling said second bus transceiver to disconnect said r bit lines and to connect said (n–r) bit lines, responding to detection of said predetermined direction.

6. The data processing apparatus of claim 5, wherein said n is 16 and said r is 8.

7. The data processing apparatus of claim 1 further comprising:

a third bus for connecting one or more peripheral circuits therewith; and a second switch means for selectively connecting and disconnecting said second and third buses electrically, wherein said control means controls said second switch means to be connected, and said first switch to be disconnected when said instruction execution unit accesses said one or more peripheral circuits.

8. The data processing apparatus of claim 7, wherein said first bus includes an m-bit first address bus and an n-bit first data bus where m and n are integers greater than zero);

said second bus includes an m-bit second address bus and an n-bit second data bus;

said third bus includes an m-bit third address bus and an n-bit third data bus;

said first switch means includes an m-bit first bus transceiver for bidirectionally connecting and disconnecting said first and second address buses, and further includes an n-bit second bus transceiver for bidirectionally connecting and disconnecting said first and second data buses; and said second switch means includes an m-bit third bus transceiver for bidirectionally connecting and disconnecting said second and third address buses, and further includes an n-bit fourth bus transceiver for bidirectionally connecting and disconnecting said second and third data buses.

9. The data processing apparatus of claim 8, wherein said control means comprises:

detecting means for detecting:

a first request indicating a request to access from the instruction execution unit to the instruction storage unit, a second request indicating a request to access from the instruction preparation unit to the data storage unit, a third request indicating a request to access from the instruction preparation unit to the instruction storage unit, a fourth request indicating a request to access from the instruction execution unit to the data storage unit, a fifth request indicating a request to access from the instruction preparation unit to the peripheral circuits, and a sixth request indicating a request to access from the instruction execution unit to the peripheral circuits; and control means for performing the following functions:

controlling said first switch means to be connected when one of the first and second requests are detected, and controlling said first switch means to be disconnected when the third and/or fourth requests are detected, controlling said first and second switch means to be connected when the fifth request is detected, and controlling said first switch means to be disconnected and said second switch means to be connected when the third and sixth requests are detected at the same time.

10. The data processing apparatus of claim 9, wherein said detecting means comprises:

a first decoding circuit for decoding an address inputted from the instruction preparation unit through said first address bus, the decoded address being regarded as the third request when the decoded address is for the instruction storage unit, being regarded as the second request when the decoded address is for the data storage unit, and being regarded as the fifth request when the decoded address is for the peripheral circuits; and a second decoding circuit for decoding an address inputted from the instruction execution unit through said second address bus, the decoded address being regarded as the first request when the decoded address is for the instruction storage unit, being regarded as the fourth request when the decoded address is for the data storage unit, and being regarded as the sixth request when the decoded address is for the peripheral circuits.

11. The data processing apparatus of claim 8, wherein said n-bit second bus transceiver is so constructed that lines composing each said data bus corresponding to r-bit ($1 \leq r \leq n-1$) can be connected and disconnected independently of the other lines corresponding to (n–r) bit, and wherein said control means comprises:

direction detecting means for, as a predetermined direction, detecting an input of a signal indicating that the (n–r) bit of the n-bit instruction to be read out next corresponds to data, and first switch control means for controlling said second bus transceiver to disconnect said r bit lines and to connect said (n–r) bit lines, responding to detection of said predetermined direction.

12. The data processing apparatus of claim 11, wherein said n is 16 and said r is 8.

13. The data processing apparatus of claim 7 further comprising:

third switch means for selectively connecting and disconnecting said second bus and an external bus therewith electrically, said external bus including an external address bus and an external data bus and connecting external circuits and/or an I/O device, wherein said control means controls said first switch means and said third switch means to be connected, and said second switch means to be disconnected when said instruction preparation unit accesses one of said I/O device and said external circuits, and said third switch means to be connected and said first switch means and said second switch means to be disconnected when said instruction execution unit accesses one of said I/O device and said external circuits.

14. The data processing apparatus of claim 13, wherein said first bus includes an m-bit first address bus and an n-bit first data bus (where m and n are integers greater than zero);

said second bus includes an m-bit second address bus and an n-bit second data bus;

said third bus includes an m-bit third address bus and an n-bit third data bus;

said first switch means includes an m-bit first bus transceiver for bidirectionally connecting and disconnecting said first and second address buses, and further includes an n-bit second bus transceiver for bidirectionally connecting and disconnecting said first and second data buses;

said second switch means includes an m-bit third bus transceiver for bidirectionally connecting and disconnecting said second and third address buses, and further includes an n-bit fourth bus transceiver for bidirectionally connecting and disconnecting said second and third data buses; and said third switch means includes an m-bit fifth bus transceiver for bidirectionally connecting and disconnecting said second and external address buses, and further includes an n-bit sixth bus transceiver for bidirectionally connecting and disconnecting said second and external data buses.

15. The data processing apparatus of claim 14, wherein said control means comprises:

detecting means for detecting:
- a first request indicating a request to access from the instruction execution unit to the instruction storage unit,
- a second request indicating a request to access from the instruction preparation unit to the data storage unit,
- a third request indicating a request to access from the instruction preparation unit to the instruction storage unit,
- a fourth request indicating a request to access from the instruction execution unit to the data storage unit,
- a fifth request indicating a request to access from the instruction preparation unit to the peripheral circuits,
- a sixth request indicating a request to access from the instruction execution unit to the peripheral circuits,
- a seventh request indicating a request to access from the instruction preparation unit to the external circuits and/or the I/O device, and
- an eighth request indicating a request to access from the instruction execution unit to the external circuits and/or the I/O device; and bus control means for performing the following functions:
- controlling said first switch means to be connected when one of the first and second requests are detected, and controlling said first switch means to be disconnected when the third and/or fourth requests are detected,
- controlling said first and second switch means to be connected when the fifth request is detected,
- controlling said first switch means to be disconnected and said second switch means to be connected when the third and sixth requests are detected at the same time,
- controlling said first and third switch means to be connected when the seventh request is detected, and
- controlling said first switch means to be disconnected and said third switch means to be connected when the eighth request is detected.

16. The data processing apparatus of claim 15, wherein said detecting means comprises:

a first decoding circuit for decoding an address inputted from the instruction preparation unit through said first address bus, the decoded address being regarded as the third request when the decoded address is for the instruction storage unit, being regarded as the second request when the decoded address is for the data storage unit, being regarded as the fifth request when the decoded address is for the peripheral circuits, and being regarded as the seventh request when the decoded address is for the external circuits and/or the I/O device; and a second decoding circuit for decoding an address inputted from the instruction execution unit through said second address bus, the decoded address being regarded as the first request when the address is for the instruction storage unit, being regarded as the fourth request when the decoded address is for the data storage unit, being regarded as the sixth request when the decoded address is for the peripheral circuits, and being regarded as the eighth request when the decoded address is for the external circuits and/or the I/O device.

17. The data processing apparatus of claim 15, wherein said third switch means further includes:

an n-bit seventh bus transceiver for bidirectionally connecting and disconnecting any k bits of said second bus and any k bits of said external bus; and a control circuit for inhibiting the operation of said sixth bus transceiver and operating said seventh bus transceiver when one of the seventh and eighth requests is detected.

18. The data processing apparatus of claim 17, wherein, when said n is 16 and said k is 8, said seventh bus transceiver selectively connects and disconnects the high-order 8 bits of said external bus and the low-order 8 bits of said second bus.

19. The data processing apparatus of claim 14, wherein said n-bit second bus transceiver is so constructed that lines composing each said data bus corresponding to r-bit ($1 \leq r \leq n-1$) can be connected and disconnected independently of the other lines corresponding to (n−r) bit, and wherein said control means comprises:
direction detecting means for, as a predetermined direction, detecting an input of a signal indicating that the (n−r) bit of the n-bit instruction to be read out next corresponds to data, and first switch control means for controlling said second bus transceiver to disconnect said r bit lines and to connect said (n−r) bit lines, responding to detection of said predetermined direction.

20. The data processing apparatus of claim 19, wherein said n is 16 and said r is 8.

21. The data processing apparatus of claim 13, wherein, when an external signal directing to release internal hardware resources is inputted, said control means controls said first, second and third switch means so that the external circuits and/or the I/O device can access the instruction storage unit, the data storage unit, and the peripheral circuits through said external bus and said third switch means.

22. The data processing apparatus of claim 21, wherein said first bus includes an m-bit first address bus and an n-bit first data bus (Where m and n are integers greater than zero);

said second bus includes an m-bit second address bus and an n-bit second data bus;

said third bus includes an m-bit third address bus and an n-bit third data bus;

said first switch means includes an m-bit first bus transceiver for bidirectionally connecting and disconnecting said first and second address buses, and further includes an n-bit second bus transceiver for bidirectionally connecting and disconnecting said first and second data buses;

said second switch means includes an m-bit third bus transceiver for bidirectionally connecting and disconnecting said second and third address buses, and further includes an n-bit fourth bus transceiver for bidirectionally connecting and disconnecting said second and third data buses; and said third switch means includes an m-bit fifth bus transceiver for bidirectionally connecting and disconnecting said second and external address buses, and further includes an n-bit sixth bus transceiver for bidirectionally connecting and disconnecting said second and external data buses.

23. The data processing apparatus of claim 22, wherein said control means comprises:

detecting means for detecting:
- a first request indicating a request to access from the instruction execution unit to the instruction storage unit,
- a second request indicating a request to access from the instruction preparation unit to the data storage unit,
- a third request indicating a request to access from the instruction preparation unit to the instruction storage unit,
- a fourth request indicating a request to access from the instruction execution unit to the data storage unit,
- a fifth request indicating a request to access from the instruction preparation unit to the peripheral circuits,
- a sixth request indicating a request to access from the instruction execution unit to the peripheral circuits,
- a seventh request indicating a request to access from the instruction preparation unit to the external circuits and/or the I/O device, and
- an eighth request indicating a request to access from the instruction execution unit to the external circuits and/or the I/O device; and bus control means for performing the following functions:
- controlling said first switch means to be connected when one of the first and second requests are detected, and controlling said first switch means to be disconnected when the third and/or fourth requests are detected,
- controlling said first and second switch means to be connected when the fifth request is detected,
- controlling said first switch means to be disconnected and said second switch means to be connected when the third and sixth requests are detected at the same time,
- controlling said first and third switch means to be connected when the seventh request is detected, and
- controlling said first switch means to be disconnected and said third switch means to be connected when the eighth request is detected.

24. The data processing apparatus of claim 23, wherein said control means further comprises bus release request detection means for detecting a request for the use of the internal buses, the request being made by the external circuits and/or the I/O device, and wherein said detecting means further detects:
- a ninth request indicating a request to access from the external circuits or the I/O device to the data storage unit, and
- a tenth request indicating a request to access from the external circuits and/or the I/O device to the peripheral circuits; and said bus control means performing the following functions:
- controlling said third switch means to be connected and controlling said first and second switch means to be disconnected when both the bus release request and the ninth request are detected, and
- controlling said second and third switch means to be connected and controlling said first switch means to be disconnected when the tenth request is detected.

25. The data processing apparatus of claim 24, wherein said detecting means further comprises a third decoding circuit for decoding an address inputted from said external circuits through said third switch means and said second address bus, the decoded address being regarded as the ninth request when the decoded address is for the data storage unit, and being regarded as the tenth request when the decoded address is for the peripheral circuits.

26. The data processing apparatus of claim 22, wherein said n-bit second bus transceiver is so constructed that lines composing each said data bus corresponding to r-bit ($1 \leq r \leq n-1$) can be connected and disconnected independently of the other lines corresponding to (n–r) bit, and wherein said control means comprises:
- direction detecting means for, as a predetermined direction, detecting an input of a signal indicating that the (n–r) bit of the n-bit instruction to be read out next corresponds to data, and
- first switch control means for controlling said second bus transceiver to disconnect said r bit lines and to connect said (n–r) bit lines, responding to detection of said predetermined direction.

27. The data processing apparatus of claim 26, wherein said n is 16 and said r is 8.

28. The data processing apparatus of claim 13, wherein said control means further comprises inhibition request detecting means for detecting an inhibition request for inhibiting the use of the peripheral circuits, the request is made by the external circuits and/or the I/O device, and wherein said bus control means inhibits accessing to said peripheral circuits when the inhibition request is detected.

29. The data processing apparatus of claim 28, wherein said first bus includes an m-bit first address bus and an n-bit first data bus (where m and n are integers greater than zero);

said second bus includes an m-bit second address bus and an n-bit second data bus;

said third bus includes an m-bit third address bus and an n-bit third data bus;

said first switch means includes an m-bit first bus transceiver for bidirectionally connecting and disconnecting said first and second address buses, and further includes an n-bit second bus transceiver for bidirectionally connecting and disconnecting said first and second data buses;

said second switch means includes an m-bit third bus transceiver for bidirectionally connecting and disconnecting said second and third address buses, and further includes an n-bit fourth bus transceiver for bidirectionally connecting and disconnecting said second and third data buses; and said third switch means includes an m-bit fifth bus transceiver for bidirectionally connecting and disconnecting said second and external address buses, and further includes an n-bit sixth bus transceiver for bidirectionally connecting and disconnecting said second and external data buses.

30. The data processing apparatus of claim 29, wherein said control means comprises:

detecting means for detecting:
- a first request indicating a request to access from the instruction execution unit to the instruction storage unit, a second request indicating a request to access from the instruction preparation unit to the data storage unit, a third request indicating a request to access from the instruction preparation unit to the instruction storage unit, a fourth request indicating a request to access from the instruction execution unit to the data storage unit, a fifth request indicating a request to access from the instruction preparation unit to the peripheral circuits, a sixth request indicating a request to access from the instruction execution unit to the peripheral circuits, a seventh request indicating a request to access from the instruction preparation unit to the external circuits and/or the I/O device, and an eighth request indicating a request to access from the instruction execution unit to the external circuits and/or the I/O device; and bus control means for performing the following functions:
controlling said first switch means to be connected when one of the first and second requests are detected, and controlling said first switch means to be disconnected when the third and/or fourth requests are detected, controlling said first and second switch means to be connected when the fifth request is detected, controlling said first switch means to be disconnected and said second switch means to be connected when the third and sixth requests are detected at the same time, controlling said first and third switch means to be connected when the seventh request is detected, and controlling said first switch means to be disconnected and said third switch means to be connected when the eighth request is detected.

31. The data processing apparatus of claim 30, wherein said bus control means controls said first and third switch means to be connected and said second switch means to be disconnected when both the inhibition request and the fifth request are detected, and wherein the bus control means further controls said third switch means to be connected and said first and second switch means to be disconnected when both the inhibition request and the sixth request are detected, as well as when both the inhibition request and the third and sixth requests are detected at the same time.

32. The data processing apparatus of claim 29, wherein said n-bit second bus transceiver is so constructed that lines composing each said data bus corresponding to r-bit ($1 \leq r \leq n-1$) can be connected and disconnected independently of the other lines corresponding to (n–r) bit, and wherein said control means comprises:
direction detecting means for, as a predetermined direction, detecting an input of a signal indicating that the (n–r) bit of the n-bit instruction to be read out next corresponds to data, and first switch control means for controlling said second bus transceiver to disconnect said r bit lines and to connect said (n–r) bit lines, responding to detection of said predetermined direction.

33. The data processing apparatus of claim 32, wherein said n is 16 and said r is 8.

34. A data processing apparatus, comprising:

an instruction storage unit for storing instructions;

an instruction preparation unit for preparing instructions for execution;

a first bus operatively connecting the instruction storage unit to the instruction preparation unit;

an instruction execution unit for executing instructions;

a data storage unit for storing data;

a second bus operatively connecting the instruction execution unit to the data storage unit;

means for providing a communication path between the first bus and the second bus, the communication path being provided to transmit information between the first bus and the second bus when either the instruction execution unit needs to access the instruction storage unit or the instruction preparation unit needs to access the data storage unit; and means for controlling the communication path of the first bus and second bus so that the first and second bus are connected when either the instruction execution unit accesses said instruction storage unit or the instruction preparation unit accesses said data storage unit and disconnected when either the instruction preparation unit accesses said instruction storage unit or when said instruction execution unit accesses said data storage unit.

* * * * *